United States Patent
Deisher et al.

(10) Patent No.: US 12,141,356 B2
(45) Date of Patent: Nov. 12, 2024

(54) COMPUTING PLATFORMS AND RELATED METHODS FOR PROVIDING ACCESSIBLE USER INTERFACES

(71) Applicant: Intel Corporation, Santa Clara, CA (US)

(72) Inventors: Michael Deisher, Portland, OR (US); Darryl Adams, Portland, OR (US); Sylvia Downing, El Dorado Hills, CA (US); Zhenyu Zhu, Folsom, CA (US); Srikanth Potluri, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 630 days.

(21) Appl. No.: 17/133,154

(22) Filed: Dec. 23, 2020

(65) Prior Publication Data

US 2021/0117003 A1    Apr. 22, 2021

Related U.S. Application Data

(60) Provisional application No. 63/105,025, filed on Oct. 23, 2020, provisional application No. 63/105,021, filed on Oct. 23, 2020.

(51) Int. Cl.
*G06F 3/0488*    (2022.01)
*G06F 3/01*    (2006.01)
(Continued)

(52) U.S. Cl.
CPC ............ *G06F 3/016* (2013.01); *G06F 3/0488* (2013.01); *G06F 3/167* (2013.01); *G06F 9/4411* (2013.01);
(Continued)

(58) Field of Classification Search
CPC ........ G06F 3/016; G06F 9/451; G06F 3/0488; G06F 3/167; G06F 9/4411; G06V 10/235;
(Continued)

(56) References Cited

U.S. PATENT DOCUMENTS 8,451,248 B1    5/2013   Kim
8,743,072 B2    6/2014   Kim
(Continued)

OTHER PUBLICATIONS

International Searching Authority, "International Preliminary Report on Patentability," issued in connection with International Patent Application No. PCT/US2021/051097, mailed on May 4, 2023, 7 pages.
(Continued)

*Primary Examiner* — Haoshian Shih
(74) *Attorney, Agent, or Firm* — Hanley, Flight & Zimmerman, LLC

(57) ABSTRACT

Computing platforms and related methods for providing accessible user interfaces are disclosed. An example apparatus includes a display controller to a display controller to sample a region of a display frame associated with a location of a touch on a display screen of a user device and logic circuitry to, after a Basic Input Output System (BIOS) is operational in the user device and prior to loading of an operating system of the user device, identify content in the display region and cause at least one output device to generate an output representative of the content, the output including at least one of an audible output or a haptic output.

20 Claims, 8 Drawing Sheets

(51) Int. Cl.
*G06F 3/16* (2006.01)
*G06F 9/4401* (2018.01)
*G06F 9/451* (2018.01)
*G06N 3/04* (2023.01)
*G06N 3/08* (2023.01)
*G06V 10/22* (2022.01)
*G06V 30/262* (2022.01)
*G10L 13/08* (2013.01)
*G09B 21/00* (2006.01)

(52) U.S. Cl.
CPC .............. *G06F 9/451* (2018.02); *G06N 3/04* (2013.01); *G06N 3/08* (2013.01); *G06V 10/235* (2022.01); *G06V 30/274* (2022.01); *G10L 13/08* (2013.01); *G09B 21/003* (2013.01); *G09B 21/006* (2013.01); *G09B 21/009* (2013.01)

(58) Field of Classification Search
CPC .......... G06V 30/274; G06N 3/04; G06N 3/08; G10L 13/08; G09B 21/003; G09B 21/006; G09B 21/009
See application file for complete search history.

(56) References Cited

U.S. PATENT DOCUMENTS

| | | | |
|---|---|---|---|
| 8,760,421 | B2 | 6/2014 | Jordan et al. |
| 9,195,328 | B2 | 11/2015 | Jordan et al. |
| 9,280,206 | B2 | 3/2016 | Nagar et al. |
| 9,304,683 | B2 | 4/2016 | Paek et al. |
| 9,367,134 | B2 | 6/2016 | Kim |
| 9,507,561 | B2 | 11/2016 | Mckiel, Jr. |
| 9,547,375 | B2 | 1/2017 | Paek et al. |
| 9,547,430 | B2 | 1/2017 | Paek et al. |
| 9,684,448 | B2 | 6/2017 | Dagar |
| 9,740,399 | B2 | 8/2017 | Paek et al. |
| 9,939,903 | B2 | 4/2018 | Kim |
| 10,032,072 | B1 | 7/2018 | Tran et al. |
| 10,489,054 | B2 | 11/2019 | Paek et al. |
| 10,628,025 | B2 | 4/2020 | White et al. |
| 10,628,121 | B2 | 4/2020 | Park et al. |
| 10,949,736 | B2 | 3/2021 | Deisher et al. |
| 10,996,851 | B2 | 5/2021 | Paek et al. |
| 2006/0123220 | A1* | 6/2006 | Colson .................... G10L 15/28 713/1 |
| 2008/0168364 | A1 | 7/2008 | Miller et al. |
| 2013/0050097 | A1 | 2/2013 | Jordan et al. |
| 2014/0049491 | A1 | 2/2014 | Nagar et al. |
| 2014/0092037 | A1 | 4/2014 | Kim |
| 2014/0098024 | A1 | 4/2014 | Paek et al. |
| 2014/0098036 | A1 | 4/2014 | Paek et al. |
| 2014/0098038 | A1 | 4/2014 | Paek et al. |
| 2014/0101545 | A1 | 4/2014 | Paek et al. |
| 2014/0101593 | A1 | 4/2014 | Paek et al. |
| 2014/0192003 | A1 | 7/2014 | Kim |
| 2014/0240270 | A1 | 8/2014 | Jordan et al. |
| 2014/0281950 | A1 | 9/2014 | White et al. |
| 2014/0282002 | A1 | 9/2014 | Mckiel, Jr. |
| 2015/0082162 | A1 | 3/2015 | Cho et al. |
| 2015/0302774 | A1 | 10/2015 | Dagar |
| 2016/0011720 | A1 | 1/2016 | Walther |
| 2016/0203625 | A1* | 7/2016 | Khan .................... G06F 40/117 345/636 |
| 2016/0252960 | A1 | 9/2016 | Kim |
| 2017/0090751 | A1 | 3/2017 | Paek et al. |
| 2017/0097807 | A1 | 4/2017 | Park et al. |
| 2018/0121796 | A1 | 5/2018 | Deisher et al. |
| 2018/0211503 | A1 | 7/2018 | Baliga et al. |
| 2018/0246622 | A1 | 8/2018 | Lee et al. |
| 2020/0064998 | A1 | 2/2020 | Paek et al. |
| 2021/0117152 | A1 | 4/2021 | Deisher et al. |
| 2023/0134984 | A1 | 5/2023 | Chen |

OTHER PUBLICATIONS

Chen et al., "An End-to-End Neural Network for Image-to-Audio Transformation," ICASSP 2023—2023 IEEE International Conference on Acoustics, Speech and Signal Processing (ICASSP), Rhodes Island, Greece, Jun. 4-10, 2023, 5 pages (copy submitted dated Mar. 10, 2023, and accessed from https://arxiv.org/abs/2303.06078 on Jul. 17, 2023).

International Searching Authority, "International Preliminary Report on Patentability," issued in connection with International Patent Application No. PCT/US2021/051100, mailed on May 4, 2023, 7 pages.

International Searching Authority, "Search Report and Written Opinion," issued in connection with International Patent Application No. PCT/US2021/051100, mailed on Dec. 28, 2021, 11 pages.

International Searching Authority, "Search Report and Written Opinion," issued in connection with International Patent Application No. PCT/US2021/051097, mailed on Jan. 3, 2022, 9 pages.

United States Patent and Trademark Office, "Final Office Action," issued in connection with U.S. Appl. No. 17/133,162, dated Apr. 18, 2024, 40 pages.

United States Patent and Trademark Office, "Non-Final Office Action," issued in connection with U.S. Appl. No. 17/133,162, dated Nov. 24, 2023 (32 pages).

* cited by examiner

COMPUTING PLATFORMS AND RELATED METHODS FOR PROVIDING ACCESSIBLE USER INTERFACES

RELATED APPLICATIONS

This patent claims priority under 35 U.S.C. § 119 to U.S. Provisional Patent Application No. 63/105,021, filed on Oct. 23, 2020, and to U.S. Provisional Patent Application No. 63/105,025, filed on Oct. 23, 2020. U.S. Provisional Patent Application No. 63/105,021 and U.S. Provisional Patent Application No. 63/105,025 are hereby incorporated by reference in their entries. Priority to U.S. Provisional Patent Application No. 63/105,021 and U.S. Provisional Patent Application No. 63/105,025 is hereby claimed.

FIELD OF THE DISCLOSURE

This disclosure relates generally to electronic computing devices and, more particularly, to computing platforms and related methods for providing accessible user interfaces.

BACKGROUND

An electronic user device can include user accessibility features to facilitate ease of access for users who are visually impaired, hearing impaired, neurologically impaired, and/or motor impaired when interacting with the device. Some user accessibility features include peripheral devices such as a Braille display for visually impaired users.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
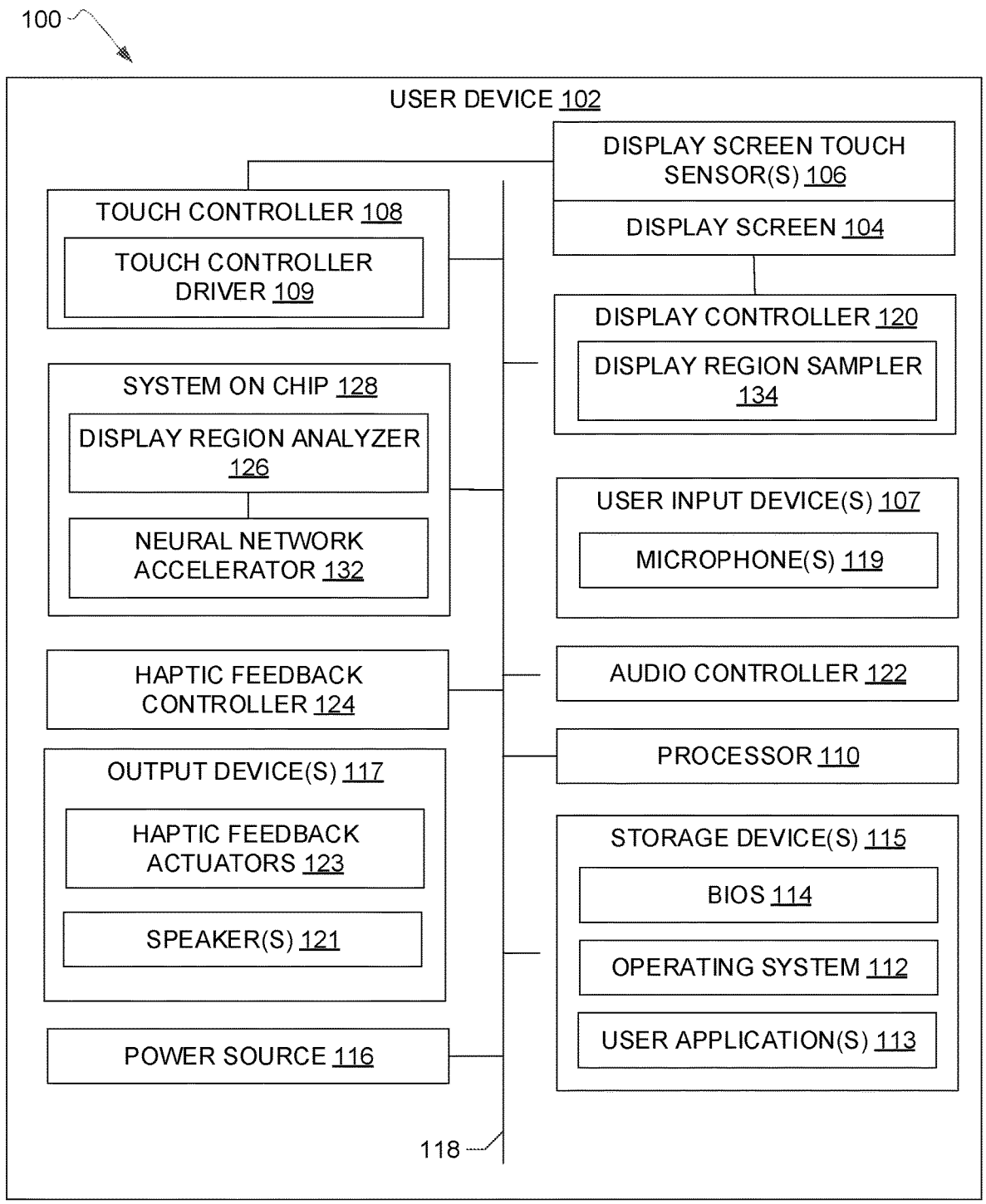
FIG. 1 illustrates an example system constructed in accordance with teachings of this disclosure and including an example user device and an example display region analyzer for identifying content in display frame(s) displayed/to be displayed via a display screen of the user device.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

An electronic user device can include user accessibility features to facilitate ease of access for users who are visually impaired, hearing impaired, neurologically impaired, and/or motor impaired when interacting with the device. Some user accessibility features are provided by an operating system of the user device and/or user applications installed on the user device to increase ease of interaction of, for instance, a visually impaired user with the device. Such user accessibility features can include adjustable sizing of icons, font, or cursors; screen contrast options; magnifiers; and/or keyboard shortcuts. Some user devices provide hardware support for peripheral Braille displays that translate text in a user interface displayed by the user device into Braille, which can be read by the user at the peripheral Braille display.

Although known user accessibility features can facilitate interactions by a visually impaired user with the user device, such user accessibility features are limited with respect to an amount of accessibility provided. For instance, known user accessibility features are typically associated with an operating system and, thus, may not be available with third-party applications installed on the user device. Therefore, user accessibility features such as increased font sizing may not be compatible with all applications installed on the user device. Further, user accessibility features that are provided by an operating system are not available if, for instance, the user device is in a pre-operating system boot mode, such as a Basic Input Output System (BIOS) mode because the operating system is not running when the user device is in the pre-boot BIOS mode. As such, the user accessibility features are not available to a user who wishes to change a change BIOS setting, perform troubleshooting of the device in BIOS mode, etc. Additionally, peripheral Braille displays are costly add-on devices that are limited to translating text into Braille, but do not provide information as to, for instance, graphical or non-text content displayed.

Disclosed herein are example computing platform systems, apparatus, and methods that provide for audio and/or haptic feedback representation(s) of content in display frame(s) (e.g., graphical user interface(s)) displayed via a display screen of an electronic user device in response to a touch event by the user on the display screen. The touch event can include a touch by a user's finger(s) and/or by an input device such as a stylus.

Example computing platforms disclosed herein include a touch controller to detect a location of the touch event on the display screen and a display controller to capture or sample an area or region of a display frame associated with the location of the touch event. Examples disclosed herein include a neural network accelerator to identify content (e.g., text, non-text or graphical element(s) such as icon(s)) in the display region associated with the touch event and to generate audio and/or haptic feedback output(s) based on the content. In some examples, audio or speech samples representative of the text identified in the display region are generated as a result of text-to-speech analysis. The audio feed is output via speakers of the device and/or peripheral audio devices (e.g., Bluetooth® headphones) to inform a user (e.g., a visually impaired user) of the text on the display screen at the touch location. In examples in which graphical elements such as shapes and/or icons are identified in the display region associated with the touch event, haptic output(s) can be generated to orient the user as the user interacts with user interface and/or provide the user with physical feedback in response to the touch (e.g., to alert the user that the user's finger is proximate to a border of a menu box). In some examples disclosed herein, the display controller adaptively responds to the results of the neural network analysis by adjusting a size or area of the display region that is sampled from the display frame to improve accuracy in the recognition of the display frame content associated with user touch event(s).

In examples disclosed herein, the touch controller, the display controller, and the neural network accelerator are implemented by a system-on-chip of the user device. This implementation provides for low-power and low-latency analysis of the display frame(s) as compared to if the analysis were performed by a central processing unit of the device. The system-on-chip architecture also permits analysis of the display frame content and determination of the corresponding audio and/or haptic outputs independent of the operating system of the device. For example, the system-on-chip architecture enables analysis of display regions(s) associated with the touch event(s) when the user device is in BIOS mode before the operating system has been loaded. Thus, examples disclosed herein provide users with accessibility features that are not limited to certain applications or operating systems and, therefore, provide a more complete accessibility experience when interacting with the device.

FIG. 1 illustrates an example system 100 constructed in accordance with teachings of this disclosure for providing accessible graphical user interfaces to a user of a user device 102 who may be visually, neurologically, and/or motor-impaired. (The terms "user" and "subject" are used interchangeably herein and both refer to a biological (e.g., carbon-based) creature such as a human being). The user device 102 can be, for example, a personal computing (PC) device such as a laptop computer, a desktop computer, an electronic tablet, an all-in-one PC, a hybrid or convertible PC, a mobile phone, a monitor, etc.

The example user device 102 of FIG. 1 includes a display screen 104. In the example of FIG. 1, the display screen 104 is a touch screen that enables a user to interact with data presented on the display screen 104 by touching the screen with a stylus and/or one or more fingers or a hand of the user. The example display screen 104 includes one or more display screen touch sensor(s) 106 that detect electrical changes (e.g., changes in capacitance, changes in resistance) in response to touches on the display screen. In some examples, the display screen is a capacitive display screen. In such examples, the display screen touch sensors 106 include sense lines that intersect with drive lines carrying current. The sense lines transmit signal data when a change in voltage is detected at locations where the sense lines intersect with drive lines in response to touches on the display screen 104. In other examples, the display screen 104 is a resistive touch screen and the display screen touch sensor(s) 106 include sensors that detect changes in voltage when conductive layers of the resistive display screen 104 are pressed together in response to pressure on the display screen from the touch. In some examples, the display screen touch sensor(s) 106 can include force sensor(s) that detect an amount of force or pressure applied to the display screen 104 by the user's finger or stylus. The force sensor(s) can include, for example, resistive force sensor(s), capacitive force sensor(s), piezoelectric sensor(s), etc.

The example user device 102 of FIG. 1 includes a touch controller 108 to process the signal data generated by the display screen touch sensor(s) 106 when the user touches the display screen 104. The touch controller 108 includes a touch controller driver 109 to enable the touch controller 108 to communicate with, for instance, the operating system 112 of the user device 102 of FIG. 1. The touch controller 108 interprets the signal data to identify particular locations of touch events on the display screen 104 (e.g., where voltage change(s) were detected by the sense line(s) in a capacitive touch screen). The touch controller 108 communicates the touch event(s) to, for example, logic circuitry such as a microcontroller on a system on chip (SoC) 128 and/or a processor 110 of the user device 102. Additionally or alternatively, the user can interact with data presented on the display screen 104 via one or more user input devices 107, such as microphone(s) 119 that detect sounds in the environment in which the user device 102 is located, a keyboard, a mouse, a touch pad, etc. In some examples, the touch controller 108 is implemented by the processor 110. In some examples, the touch controller 108 is implemented by the SoC 128 (e.g., by a microcontroller of the SoC 128).

The processor 110 of the illustrated example is a semiconductor-based hardware logic device. The hardware processor 110 may implement a central processing unit (CPU) of the user device 102. The processor 110 may include any number of cores and may be implemented, for example, by a processor commercially available from Intel® Corporation. The processor 110 executes machine readable instructions (e.g., software) including, for example, an operating system 112 and/or other user application(s) 113 installed on the user device 102, to interpret and output response(s) based on the user input event(s) (e.g., touch event(s), keyboard input(s), etc.). In this example, the processor 110 implements a Basic Input/Output System (BIOS) 114, or firmware that provides for initialization of hardware of the user device 102 during start-up of the user device 102 prior to loading of the operating system software 112. The operating system 112, the user application(s) 113, and the BIOS 114 are stored in one or more storage devices 115. The user device 102 of FIG. 1 includes a power source 116 such as a battery and/or a transformer and AC/DC converter to provide power to the processor 110 and/or other components of the user device 102 communicatively coupled via a bus 118. Some or all of the processor 110 and storage device(s) 115 may be located on a same die and/or on a same printed circuit board (PCB). The semiconductor die may be separate from a die of the SoC 128. The dies of the SoC 128 and the CPU may be mounted to the same PCB or different PCBs.

A display controller 120 (e.g., a graphics processing unit (GPU)) of the example user device 102 of FIG. 1 controls operation of the display screen 104 and facilitates rending of content (e.g., display frame(s) associated with graphical user interface(s)) via the display screen 104. As discussed above, the display screen 104 is a touch screen that enables the user to interact with data presented on the display screen 104 by touching the screen with a stylus and/or one or more fingers of a hand of the user. In some examples, the display controller 120 is implemented by the processor 110. In some examples, the display controller 120 is implemented by the SoC 128. In some examples, the processor 110, the touch controller 108, the display controller 120 (e.g., a GPU), and the SoC 128 are implemented on separate chips (e.g., separate integrated circuits), which may be carried by the same or different PCBs.

The example user device 102 includes one or more output devices 117 such as speakers 121 to provide audible outputs to a user. The example user device 102 includes an audio controller 122 to control operation of the speaker(s) 121 and facilitate rendering of audio content via the speaker(s) 121. In some examples, the audio controller 122 is implemented by the processor 110. In some examples, the audio controller 122 is implemented by the SoC 128 (e.g., by a microcontroller of the SoC 128). In other examples, the audio controller 122 is implemented by stand-alone circuitry in communication with one or more of the processor 110 and/or the SoC 128.

The example output device(s) 117 include one or more haptic feedback actuator(s) 123 (e.g., piezoelectric actuator(s)) to produce, for instance, vibrations. The example haptic feedback actuator(s) 123 of FIG. 1 can provide haptic feedback or touch experiences to the user of the user device 102 via vibrations, forces, etc. that are output in response to, for example, touch event(s) on the display screen 104 of the device 102. The example user device 102 includes a haptic feedback controller 124 to control the actuator(s) 123. In some examples, the haptic feedback controller 124 is implemented by the processor 110. In some examples, the haptic feedback controller 124 is implemented by the SoC 128 (e.g., by a microcontroller of the SoC 128). In other examples, the haptic feedback controller 124 is implemented by stand-alone circuitry in communication with one or more of the processor 110 and/or the SoC 128.

Although shown as one device 102, any or all of the components of the user device 102 may be in separate housings and, thus, the user device 102 may be implemented as a collection of two or more user devices. In other words, the user device 102 may include more than one physical housing. For example, the logic circuitry (e.g., the SoC 128 and the processor 110) along with support devices such as the one or more storage devices 115, a power supply 116, etc. may be a first user device contained in a first housing of, for example, a desktop computer, and the display screen 104, the touch sensor(s) 106, and the haptic feedback actuator(s) 123 may be contained in a second housing separate from the first housing. The second housing may be, for example, a display housing. Similarly, the user input device(s) 107 (e.g., microphone(s) 119, camera(s), keyboard(s), touchpad(s), mouse, etc.) and/or the output device(s) (e.g., the speaker(s) 121 and/or the haptic feedback actuator(s) 123) may be carried by the first housing, by the second housing, and/or by any other number of additional housings. Thus, although FIG. 1 and the accompanying description refer to the components as components of the user device 102, these components can be arranged in any number of manners with any number of housings of any number of user devices.

In the example of FIG. 1, the touch event(s) (e.g., user finger and/or stylus touch input(s)) detected by the display screen touch sensor(s) 106 and processed by the touch controller 108 facilitate analysis of user interface content in the display frame(s) rendered via the display screen 104 and associated with the location(s) of the touch event(s) on the display screen 104. The touch controller 108 generates touch coordinate position data indicative of location(s) or coordinate(s) of the touch event(s) detected by the display screen touch sensor(s) 106 on the display screen 104. In response to communication from the touch controller 108 identifying a touch event on the display screen 104, the display controller 120 captures or samples a region or area of a display frame rendered via the display screen 104 at the time of the touch event and associated with the location of the touch event. As disclosed herein, the sampled display region(s) are used in connection with position data of the touch event(s) to identify content on the screen 104 with which the user is interacting and to generate audio and/or haptic feedback output(s) indicative of the content.

The example user device 102 of FIG. 1 includes a display region analyzer 126 to process outputs of the touch controller 108 and the display controller 120. The display region analyzer 126 analyzes the data from the touch controller 108 and the display controller 120 to identify content in the sampled display region(s) and to generate output(s) representative of the content. As disclosed herein, the display region analyzer 126 executes neural network model(s) to identify (e.g., predict, classify) content in the sampled display region such as text, non-text character(s) or graphical element(s) (e.g., a border line of a window or menu associated with a user application), or portion(s) of the captured display region that do not include text and/or graphical element(s) (e.g., empty or blank portion(s)). As a result of the neural network analysis, the display region analyzer 126 identifies content (e.g., audio content, graphical or non-text element(s)) and corresponding output(s) (e.g., audio output(s), haptic feedback output(s)) to inform a user of the device 102 of the content on the display screen 104. In some examples, the display region analyzer 126 generates the output(s) to be provided via the audio controller 122 and/or the haptic feedback controller 124 in response to execution of neural network model(s) generated via end-to-end neural network training.

In the example of FIG. 1, the display region analyzer 126 is implemented by the SoC 128 carried by the user device 102. The SoC 128 of FIG. 1 is separate from the (e.g., main or central) processing platform that executes, for example, the operating system of the device 102 (e.g., the processor 110 of FIG. 1). The SoC 128 and the processor 110 may be mounted to the same printed circuit board or the SoC 128 and the processor 110 may be on separate printed circuit boards. The example SoC 128 of FIG. 1 includes a hardware processor such as a microcontroller or any other type of processor sold by Intel® Corporation. The display region analyzer 126 can be implemented by dedicated logic circuitry or by a processor such as a microcontroller executing instructions on the SoC 128.

The example SoC 128 of FIG. 1 includes a neural network accelerator 132. The neural network accelerator 132 can be implemented by, for example an accelerator such as the Intel® Gaussian & Neural Accelerator (Intel® GNA). The neural network accelerator 132 can be implemented by dedicated logic circuitry or by a processor such as a microcontroller executing instructions on the SoC 128. In some examples, the display region analyzer 126 and the neural network accelerator 132 are implemented by the same microcontroller of the SoC 128. In other examples, the neural network accelerator 132 is implemented by a different processor (e.g., a microcontroller) on the SoC 128, by the processor 110, or by a separate SoC. In other examples, the user device 102 does not include a neural network accelerator.

The SoC 128 of FIG. 1 enables the display region analyzer 126 to execute independent of the operating system 112 of the user device 102. As a result, the display region analyzer 126 can respond to user touch event(s) with audio output(s) and/or haptic feedback output(s) irrespective of the state of the operating system 112 (e.g., before the operating system 112 loads and, when the user is interacting with the BIOS 114 (e.g., a pre-boot mode when the BIOS is active and the operating system 112 is inactive)). Also, the SoC subsystem 128 can consume less power than if the display region analyzer 126 were implemented by the same processor 110 that implements the operating system 112 of the device 102 because, for example, the SoC 128 may include lower power-consuming, less complex circuitry than the main processor 110.

In the example of FIG. 1, the display region analyzer 126 serves to process the touch event position data generated by the touch controller 108 and the display region data generated by the display controller 120 to identify content displayed on the display screen 104 at or near the location of the user's touch on the display screen using neural network processing. The display region analyzer 126 generates audio output(s) corresponding to the text in the sampled display region of the display frame displayed at the time of the touch event on the display screen 104. The audio output(s) are presented to the user via one or more transducers such as the speaker(s) 121 of the user device 102 or peripheral audio device(s) to inform, for example, a visually impaired user of the content displayed on the display screen 104 at the location of the touch event. In some examples, the display region analyzer 126 analyzes the touch event position data and the display region data to generate haptic feedback output(s) via one or more haptic devices such as the haptic feedback actuator(s) 123. The haptic feedback output(s) are used to alert the user to, for example, the presence of edges of a menu or window box at specific screen locations corresponding to the user's finer(s) and/or stylus as the user moves his or her finger(s) and/or the stylus across the display screen 104.

The touch controller 108 generates coordinate data or touch position data representing a location of a user's touch on the display screen 104 in response to signal(s) received from the display screen touch sensor(s) 106 when the user and/or an input device (e.g., a stylus) touches the screen 104. The touch controller 108 can identify the coordinates (e.g., x-y coordinates) for the location(s) of the touch event(s) on the screen 104 based on, for instance, changes in capacitance or voltage captured in the signal data generated by the display screen touch sensor(s) 106. In some examples, the touch position data can include a time at which the touch event occurred. In some examples, the touch position data represents changes in the position of the user's finger(s) and/or the stylus relative to the screen 104 as the user makes gestures on the screen and/or moves his finger(s) and/or the stylus on the screen 104.

The touch controller 108 transmits the touch coordinate data to the display region analyzer 126. In some examples, the display region analyzer 126 receives the touch position data from the touch controller 108 in substantially real-time (as used herein "substantially real time" refers to occurrence in a near instantaneous manner recognizing there may be real world delays for computing time, transmission, etc.). In other examples, the touch controller 108 transmits the touch position data to the display controller 120 to alert the display controller 120 of the touch event.

In response to notification of a touch event from the touch controller 108 and/or the display region analyzer 126, the display controller 120 identifies and saves the display frame rendered at the time of the touch event. The display controller 120 of FIG. 1 includes a display region sampler 134. The display region sampler 134 samples or captures portion(s) or region(s) of the display frame(s) rendered via the display screen 104 in response to receipt of the touch position data from the touch controller 108 and/or in response to instructions from the display region analyzer 126. The display region sampler 134 samples a portion or region of the display screen corresponding to the location of the touch in substantially real-time (e.g., within milliseconds of the touch event). As a result of the sampling, the display region sampler 134 generates display region data including image data of captured or sampled portion(s) or region(s) of the display frame(s). For example, a rectangle (e.g., square) of the region surrounding the touch event centered on the point of touch may be sampled. In some examples, the display region data generated by the display region sampler 134 includes a full display frame instead of a portion of the frame.

As disclosed herein, the boundaries that define a size or resolution of the region of the display frame that is sampled by the display region sampler 134 can be defined by one or more variables. For example, the size or area of the captured display region can be defined by content located within a threshold distance of the coordinates corresponding to the location of the touch event on the display screen 104 (e.g., as defined by the touch position data received from the touch controller 108 and/or the display region analyzer 126). In other examples, the size of the display region captured by the display region sampler 134 is defined based on an amount of pressure or force associated with the touch event on the display screen 104 (e.g., as detected by the touch sensor(s) 106) and/or a duration of the touch event. For instance, the display region sampler 134 may sample a larger portion of the display frame in response to an increased duration and/or increased force associated with the touch event as compared to a touch event having a shorter duration. As disclosed herein, in some examples, the size or area of the sampled display region is based on results of the neural network analysis of content associated with display frame(s) by the neural network accelerator 132 indicating, for instance, font size(s) in the display frame.

The display controller 120 transmits the sampled display region data to the display region analyzer 126. In some examples, the display controller 120 includes two or more display pipes for the transmission of data (e.g., display frame(s) rendered via the display screen 104 of FIG. 1). In some such examples, the display controller 120 allocates one of the display pipes for output of the display region data. The dedicated display pipe serves as a secure display pipe to provide content protection to prevent, for instance, illegal copying of protected content. In other examples, transmission of the sampled display region data is shared between two or more display pipes.

In some examples, the display region sampler 134 of the display controller 120 scales the sampled display regions output to the display region analyzer 126. For example, an area of the display screen 104 may be x by y pixels, but a font size adjustment may require x' by y' pixels for evaluation of a display region. The display controller 120 can deliver one or more scaled versions of the same display region for evaluation by the display region analyzer 126 (e.g., based on pyramid scaling). The display controller 120 adjusts the scaling (e.g., increase or decrease) of the display region(s) to enable accurate evaluation of the contents of the display frame. In particular, the scaling performed by the display controller 120 with respect to the actual size of the content and/or features thereof being evaluated provides for increased accuracy in analysis of the content displayed via the display screen 104.

As a result of the neural network analysis performed by the display region analyzer 126 (e.g., via the neural network accelerator 132), the display region analyzer 126 identifies content (e.g., text, non-text character(s)) in the sampled display region and generates instructions for one or more of the audio controller 122 or the haptic feedback controller 124 to generate audio or haptic feedback outputs, respectively. In particular, in response to the detection of text in the display region data captured by the display region sampler 134 of the display controller 120, the display region analyzer 126 instructs the audio controller 122 to output audio or speech data corresponding to the text (e.g., via text-to-speech analysis). In some examples, in response to detection of non-text character(s) and/or graphical element(s) such as icon(s) or shape(s) in the sampled display region data, the display region analyzer 126 instructs the haptic feedback controller 124 to cause the actuator(s) 123 of the device 102 to output haptic feedback (e.g., vibration(s)). Additionally or alternatively, the display region analyzer 124 can instruct the audio controller to output audio (e.g., sound effects) in response to the detection of non-text characters (e.g., in examples in which haptic feedback is not available).

As disclosed herein, the audio controller 122 and/or the haptic feedback controller 124 may be implemented by the processor 110. The display region analyzer 126 (e.g., a microcontroller of the SoC 128) may, thus, output requests to the processor 110 to cause the audio controller 122 and/or the haptic feedback controller 124 to take the actions described herein. In some examples, the audio controller 122 and/or the haptic feedback controller 124 are implemented by the BIOS 114 (the basic input output system which controls communications with input/output devices). In such examples, the SoC 128 communicates with the audio controller 122 and/or the haptic feedback controller 124 by sending requests to the processor 110 that implements the audio controller 122 and/or the haptic feedback controller 124.

In other examples, the audio controller 122 and/or the haptic feedback controller 124 are one or more components separate from the SoC 128 and separate from the processor 110. As such, the SoC 128 may communicate with the audio controller 122 and/or the haptic feedback controller 124 without involving the processor 110. Similarly, the processor 110 may communicate with the audio controller 122 and/or the haptic feedback controller 124 without the involvement of the SoC 128. In some examples, the SoC 128 communicates with the audio controller 122 and/or the haptic feedback controller 124 at least (e.g., only) prior to loading of the operating system 112 and the processor 110 communicates with the audio controller 122 and/or the haptic feedback controller 124 at least (e.g., only) after the loading of the operating system 112.

Figure 2:
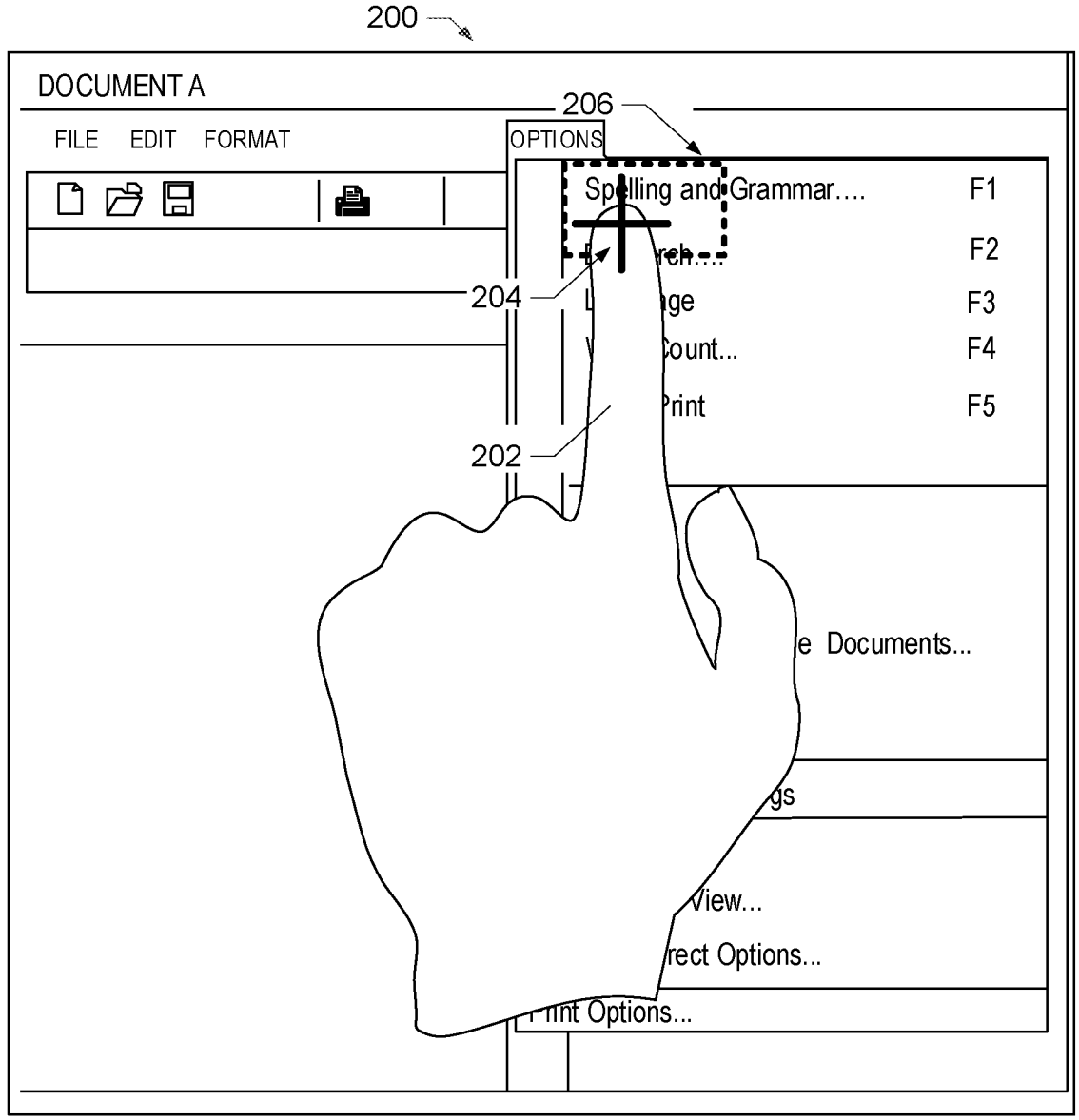
FIG. 2 illustrates a user touch event relative to an example display frame presented via the display screen of the example user device of FIG. 1.

FIG. 2 illustrates an example display frame 200 that can be rendered via the display screen 104 of the user device 102 of FIG. 1. As shown in FIG. 2, a user touches the display screen 104 with his or her finger 202 at location 204 (or, in other examples, using an input device such as a stylus). In response to the touch event, the touch controller 108 of FIG. 1 generates the touch position data indicative of the location or coordinates of the user's touch relative to the display screen 104 of FIG. 1.

As discussed above, in response to the touch event, the display region sampler 134 of the display controller 120 of FIG. 1 samples a portion of the display frame 200 to generate display region data. The display region data includes a portion or region 206 of the display frame 200 including content displayed at the location of the touch event and in surrounding proximity to the touch event. As discussed above, the size or area of the region 206 and, thus, the captured content can be based on variables such as an amount of pressure associated with the touch event. As disclosed herein, the display region analyzer 126 of FIG. 1 analyzes the touch position data and the sampled display region data 206 to identify (e.g., predict) the presence of the word "spelling" in the display region proximate to the location of the touch event. As a result of the identification of the word "spelling" in the sampled display region 206 near the location of the touch event, the display region analyzer 126 causes the user device 102 to output audio of the word "spelling" (e.g., by sending a request to the processor 110 implementing the audio controller 122) to inform the user of the word that is displayed proximate to the user's touch.

Figure 3:
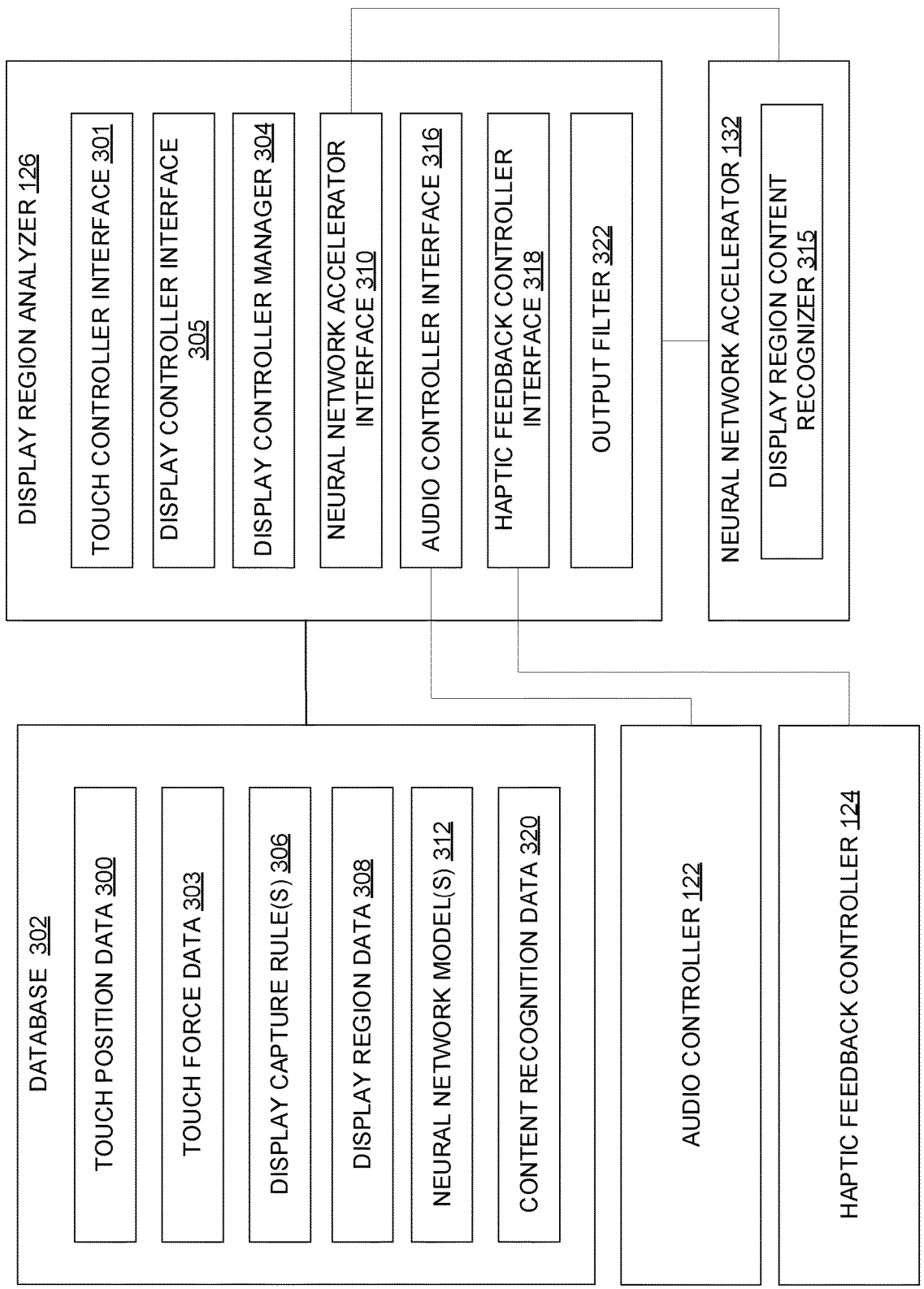
FIG. 3 is a block diagram including an example implementation of the display region analyzer of FIG. 1 in accordance with teachings of this disclosure.

FIG. 3 is a block diagram showing an example implementation of the display region analyzer 126 of FIG. 1. As disclosed above, the display region analyzer 126 is implemented by the SoC 128 of the user device 102 (e.g., by dedicated circuitry and/or a microcontroller of the SoC 128). As shown in FIG. 3, the display region analyzer 126 is in communication with the neural network accelerator 132. In some examples, the neural network accelerator 132 and the display region analyzer 126 are implemented by the same processor (e.g., microcontroller) on the SoC 128. In other examples, the neural network accelerator 132 and the display region analyzer 126 are implemented by different processors (e.g., different microcontrollers on the SoC 128)

The display region analyzer 126 of FIG. 3 includes a touch controller interface 301. The touch controller interface 301 provides means for communicating with the touch controller 108. For example, the touch controller interface 301 can be implemented by circuitry that connects the display region analyzer 126 to communication line(s) of the touch controller 108. The touch controller interface 301 may be implemented by dedicated hardware circuitry and/or by a microcontroller of the SoC 128 to carry signal 404 of the communication flow diagram of FIG. 4.

As discussed above, the display region analyzer 126 receives touch position data 300 from the touch controller 108 in response to the touch event(s) (e.g., by a user's finger and/or an input device such as a stylus) on the display screen 104. The touch position data 300 includes coordinate position(s) of the touch event(s) relative to the display screen 104. The touch position data 300 can include a time at which the touch event occurred. The touch position data 300 can be stored in a database 302. In some examples, the display region analyzer 126 includes the database 302. In other examples, the database 302 is located external to the display region analyzer 126 in a location accessible to the display region analyzer 126 as shown in FIG. 3. The example database 302 of the illustrated example of FIG. 3 is implemented by any memor(ies), storage device(s) and/or storage disc(s) for storing data such as, for example, flash memory, magnetic media, optical media, etc. Furthermore, the data stored in the example database 302 may be in any data format such as, for example, binary data, comma delimited data, tab delimited data, structured query language (SQL) structures, image data, etc.

In some examples, the display region analyzer 126 receives touch force data 303 generated by the display screen touch sensor(s) 106 (e.g., resistive force sensor(s), capacitive force sensor(s), piezoelectric force sensor(s)). The touch force data 303 includes an amount of force or pressure associated with the user's touch on the display screen 104. In some examples, the touch force data 303 indicates a duration for which the pressure was applied. The touch force data 303 is stored in the database 302.

The display region analyzer 126 of FIG. 3 includes a display controller interface 305. The display controller interface 305 provides means for communicating with the display controller 120. For example, the display controller interface 305 can be implemented by circuitry that connects the display region analyzer 126 to communication line(s) of the display controller 120. The display controller interface 305 may be implemented by dedicated hardware circuitry and/or by a microcontroller of the SoC 128 to carry signal 406 of the communication flow diagram of FIG. 4.

The display region analyzer 126 includes a display controller manager 304. The display controller manager 304 provides means for instructing the display region sampler 134 of the display controller 120 to capture region(s) of display frame(s) (e.g., the display frame 200 of FIG. 2) rendered via the display screen 104 in response to touch event(s). The display controller manager 304 may be implemented by dedicated hardware circuitry and/or by a microcontroller of the SoC 128. The display controller manager 304 outputs signals 426, 441 of the communication flow diagram of FIG. 4 when executing blocks 508 and 514 of the flowchart of FIG. 5. The instruction(s) generated via the display controller manager 304 can be transmitted via the display controller interface 305.

The display controller manager 304 instructs the display region sampler 134 of the display controller 120 to sample region(s) or portion(s) of the rendered display frame(s) (e.g., in response to the touch position data 300 (e.g., coordinate data) indicative of location(s) of touch event(s) on the display screen 104). The size or area of the sampled display region to be captured by the display region sampler 134 can be defined by display region capture rule(s) 306 stored in the database 302. In some examples, a size of the display region captured by the display region sampler 134 is based on a pressure associated with the touch event and/or a duration of the touch event as represented by the touch force data 303. As disclosed herein, in some examples, a size of the display region captured by the display region sampler 134 is based on properties of the content in the display frame, such as a font size of text identified in previous sampled display regions(s) by a display region content recognizer 315. As also disclosed herein, in some examples, the display region capture rule(s) 306 are modified based on results of the neural network analysis performed by the display region content recognizer 315.

In the example of FIG. 3, display region data 308 generated by the display region sampler 134 of the display controller 120 of FIG. 2 is stored in the database 302. The display region data 308 can include portion(s) or region(s) of the display frame(s) rendered via the display screen 104 of the user device 102 and associated with the location of the touch event(s). In some examples, the display region sampler 134 of the display controller 120 automatically generates the display region data periodically (e.g., several times a second) and outputs the results in response to receiving instructions from the display controller manager 304. In other examples, the display region sampler 134 generates the display region data 308 in response to requests from the display controller manager 304 (e.g., on-demand).

The example display region analyzer 126 of FIG. 2 includes a neural network accelerator interface 310. The neural network accelerator interface 310 provides means for communicating with the neural network accelerator 132 in examples when the neural network accelerator 132 is implemented by a different processor than the display region analyzer 126. For example, the neural network accelerator interface 310 can carry signals between the display region analyzer 126 and the neural network accelerator 132. The neural network accelerator interface 310 may be implemented by dedicated hardware circuitry and/or by a microcontroller of the SoC 128 to carry signals 408 and 432 of the communication flow diagram of FIG. 4.

In the example of FIG. 3, the neural network accelerator 132 includes the display region content recognizer 315. The display region content recognizer 315 provides means for identifying content in the display region data 308 via neural network analysis. The display region content recognizer 315 may be implemented by dedicated hardware circuitry and/or by a microcontroller of the SoC 128. The display region content recognizer 315 outputs signals 434, 440 of the communication flow diagram of FIG. 4 when executing blocks 504, 510, and 511 of the flowchart of FIG. 5.

For example, the neural network accelerator interface 310 can transmit instructions for the display region content recognizer 315 generated by the display controller manager 304 in response to receipt of the display region data 308 from the display controller 120. The instructions can activate the neural network accelerator 132. However, in other examples, the user device 102 does not include a neural network accelerator 132.

In response to receipt of the display region data 308, the display region content recognizer 315 executes neural network model(s) 312 to identify (e.g., predict) content in a sampled display region associated with a touch event and to provide audio output(s) and/or haptic feedback output(s) based on the identified content (e.g., image recognition). The neural network model(s) 312 can be generated using end-to-end training of one or more neural networks such that, for each sampled display region in the display region data 308 provided as an input to the display region content recognizer 315, the display region content recognizer 315 generates the audio output and/or haptic feedback output to be provided.

In the example of FIG. 3, known or reference display frame(s) and/or portion(s) thereof can be used as training data to train a neural network and to generate the neural network model(s) 312. For example, the training data (e.g., the known display frame(s) and/or display region data) can be labeled with content in the display frame(s) that should prompt an audio output (e.g., text) and/or a haptic feedback output (e.g., graphical element(s) such as icon(s) or lines defining menu boxes). In some examples, the content is labeled to cause both an audio output and a haptic feedback output (e.g., an icon that includes text, a border of a window that includes text). In some examples, fragments of words are used in the training data to train the neural network to predict the text in the sampled display region (e.g., to predict that the term "say" is most likely the word "save").

In some examples, the training data is also labeled content that should not prompt an audio output and/or a haptic feedback output. For example, blank or empty portions of the user interface(s) that do not include text and/or non-text character(s) or graphical elements(s) may be labeled as content that should not prompt an output. In some examples, portions or fragments of word(s), phrase(s) and/or spaces between words may be labeled as content that should not prompt an output (e.g., an audio output) to prevent nonsensical output(s) (e.g., audio that does not correspond to an actual word). For instance, the phrase "ot set" in "boot settings" could be used to train the neural network to refrain from outputting a predicted word that would not correspond to an actual word. However, in some other examples, blank or empty portions of the user interface(s) that do not include text and/or graphical elements(s) may be labeled as content that is to cause a haptic feedback output to alert a user that the user's touch has moved away from text.

In examples in which the neural network is trained using end-to-end training, the training data is labeled with the audio output (e.g., text-to-speech) and/or haptic feedback output that is to be produced for the predicted content. In such examples, the display region content recognizer 315 generates audio output(s) or haptic feedback output(s) as a result of the execution of the neural network model(s) 312. The output(s) are provided to the audio controller 122 and/or haptic feedback controller 124. For example, the display region content recognizer 315 can generate speech sample(s) in response to the detection of text and generate audio sample(s) (e.g., audio output buffer) for transmission to the audio controller 122.

As a result of the execution of the neural network model(s) 312, the display region content recognizer 315 identifies the type of user interface content associated with the touch event (e.g., text, graphical element, or empty portion) and corresponding response (e.g., audio output, haptic feedback output, or no output). For example, referring to the example display region 206 of the display frame 200 of FIG. 2, the display region content recognizer 315 can determine that audio of the word "spelling" should be output in response to the identification of the word "spelling" in the display region data proximate to the location of the user's touch. The display region content recognizer 315 generates an audio sample of the word "speech" as an output of the neural network accelerator 132. As another example, if the display region content recognizer 315 detects a shape such as a line or a graphical icon in the sampled display region proximate to the position of the user's touch, the display region content recognizer 315 determines haptic event(s) and/or audio output(s) (e.g., sound effects) to be provided.

The display region content recognizer 315 analyzes the display region data 308 received from the display controller 120 in response to changes in the location(s) of the touch event(s) occurring on the display screen 104. In some examples, the display region content recognizer 315 analyzes the display region data 308 in substantially real-time as the display region data 308 is received from the display controller 120 to enable audio and/or haptic feedback output(s) to be provided in substantially real-time as the user interacts with the display screen 104 of the user device 102 and the display frame(s) rendered thereby.

The example display region analyzer 126 of FIG. 2 includes an audio controller interface 316. The audio controller interface 316 provides means for communicating with the audio controller 122 of the user device 102 of FIG. 1. For example, the audio controller interface 316 can be implemented by circuitry that connects the display region analyzer 126 to communication line(s) of the audio controller 122. The audio controller interface 316 may be implemented by dedicated hardware circuitry and/or by a microcontroller of the SoC 128 to carry signal 410 of the communication flow diagram of FIG. 4.

The audio controller interface 316 facilitates transmission of instructions to the audio controller 122 to cause the audio controller 122 to initiate an audio stream to render audio output(s) in response to the neural network analysis performed by the display region content recognizer 315. For example, the audio controller interface 316 can transmit audio sample(s) (e.g., an audio output buffer) generated by the display region content recognizer 315 as a result of the execution of the neural network model(s) 312.

The example display region analyzer 126 of FIG. 3 includes a haptic feedback controller interface 318. The haptic feedback controller interface 318 provides means for communicating with the haptic feedback controller 124 of the user device 102. For example, the haptic feedback controller interface 318 can be implemented by circuitry that connects the display region analyzer 126 to communication line(s) of the haptic feedback controller 124. The haptic feedback controller interface 318 may be implemented by dedicated hardware circuitry and/or by a microcontroller of the SoC 128 to carry signal 411 of the communication flow diagram of FIG. 4. The haptic feedback controller interface 318 facilitates transmission of instructions for the haptic feedback controller 124 to cause the haptic feedback actuator(s) 123 of the user device 102 to generate haptic feedback in response to, for example, detection of text and/or graphical elements (e.g., icon(s)) in the display region data.

In the example of FIG. 3, the results of the neural network processing can be used to define or modify the display capture rule(s) 306 that define a size or area of the display region to be captured by the display region sampler 134 of the display controller 120 in response to a touch event. For example, data (e.g., image data) including the text or graphical elements (e.g., icons) recognized or identified by the display region content recognizer 315 as a result of performing the neural network analysis can be stored as content recognition data 320 in the database 302. The display region content recognizer 315 can analyze the content recognition data 320 to determine, for instance, a font size of the text and/or a size of the icon (e.g., by using optical character recognition). Based on the detected font size and/or icon size detected, the display region content recognizer 315 updates the display capture rule(s) 306 and generates corresponding instruction(s) to cause the display region sampler 134 to increase or decrease the size of future display region(s) that are sampled from a display frame. The update(s) to the rule(s) 306 can improve a likelihood of capturing complete or non-fragmented content (e.g., word(s), text) in the display region data 308. Similarly, the feedback to the rule(s) 306 can be used to prevent the display region sampler 134 from sampling a large portion of a display frame that includes text with a small font size to increase a likelihood of accurately identifying the content associated with the touch event over other content proximate to the touch event.

In some examples, the display region content recognizer 315 may identify content such as text in the display region data 308 but may be unable to recognize or predict the text because, for example, only a fragment of the text is included in the sampled display region. In response to this failure (e.g., the partial word detection) by the display region content recognizer 315, the display controller manager 304 can instruct the display region sampler 134 to re-sample the region of the display frame associated with the touch event to increase a size or area of the sampled display region provided to the display region content recognizer 315 in an effort to provide the display region content recognizer 315 with the full word(s). For example, the display controller manager 304 can instruct the display region sampler 134 to re-sample the display frame to capture a larger portion or area of the display frame located to the right or left of the identified word in an effort to capture to the full word. Thus, the display region analyzer 126 of FIG. 3 adaptively responds to the result(s) of the neural network processing to control or scale size(s) of the display region(s) sampled by the display controller 120 and provided to the display region content recognizer 315 for analysis.

In some examples, the display region analyzer 126 of FIG. 3 includes an output filter 322. The output filter 322 provides means for verifying that audio and/or haptic feedback output(s) should be provided based on the touch position data 300 received from the touch controller 108. The output filter 322 may be implemented by dedicated hardware circuitry and/or by a microcontroller of the SoC 128 executing block 509 of the flowchart of FIG. 5.

For example, if, based on touch event coordinate data in the touch position data 300, the output filter 322 determines that a touch event at a particular location or coordinates on the display screen 104 has exceeded a threshold duration (e.g., 5 seconds), the output filter 322 determines that the user has not moved his or her finger on the display screen and/or the input device (e.g., stylus) has not moved on the display screen (i.e., the user is maintaining his or her finger or the stylus at a particular location on the display screen 104). In such examples, if the display region content recognizer 315 determines that audio and/or haptic feedback should be output based on the content in the display region associated with the touch event, the output filter 322 prevents or interrupts repeated audio and/or haptic output(s) from being output after the initial audio and/or haptic feedback output(s) have been provided via the audio controller 122 or the haptic feedback controller 124, respectively. Thus, the output filter 322 provides for smart filtering of the output(s) identified by the display region content recognizer 315 to prevent a stream of repetitive audio and/or haptic output(s) (e.g., the same audio output of a word on repeat) from being provided while the user is not moving his or her finger and/or not moving the stylus relative to the display screen 104.

As also disclosed above, the neural network model(s) 312 executed by the display region content recognizer 315 are trained to recognize portion(s) of the sampled display region(s) that do not include text or graphical element(s) (e.g., shape(s)) and/or that include fragments of words that would result in nonsensical audio outputs. In such examples, the display region content recognizer 315 classifies such portion(s) of the display region(s) as not associated with audio and/or haptic feedback output. As a result, no output(s) are provided to the audio controller 122 and/or the haptic feedback controller 124. Thus, the example display region analyzer 126 provides for multiple levels of filtering (e.g., via the neural network analysis, via the output filter 322) in response to properties of the display region(s) and/or the touch event(s).

While an example manner of implementing the display region analyzer 126 and the neural network accelerator 132 of FIG. 1 is illustrated in FIG. 3, one or more of the elements, processes and/or devices illustrated in FIG. 3 may be combined, divided, re-arranged, omitted, eliminated and/or implemented in any other way. Further, the example touch controller interface 301, the example database 302, the example display controller manager 304, the example display controller interface 305, the example network accelerator interface 310, the example display region content recognizer 315, the example audio controller interface 316, the example haptic feedback controller interface 318, the example output filter 322, and/or, more generally, the example display region analyzer 126 and the neural network accelerator 132 of FIG. 3 may be implemented by hardware, software, firmware and/or any combination of hardware, software and/or firmware. Thus, for example, any of the example touch controller interface 301, the example database 302, the example display controller manager 304, the example display controller interface 405, the example network accelerator interface 310, the example display region content recognizer 315, the example audio controller interface 316, the example haptic feedback controller interface 318, the example output filter 322, and/or, more generally, the example display region analyzer 126 and the neural network accelerator 132 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example touch controller interface 301, the example database 302, the example display controller manager 304, the example display controller interface 305, the example network accelerator interface 310, the example display region content recognizer 315, the example audio controller interface 316, the example haptic feedback controller interface 318, and/or the example output filter 322 is/are hereby expressly defined to include a non-transitory computer readable storage device or storage disk such as a memory, a digital versatile disk (DVD), a compact disk (CD), a Blu-ray disk, etc. including the software and/or firmware. Further still, the example display region analyzer 126 may include one or more elements, processes and/or devices in addition to, or instead of, those illustrated in FIG. 3, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the display controller 120 is illustrated in FIG. 1, one or more of the elements, processes and/or devices illustrated in FIG. 1 may be combined, divided, re-arranged, omitted, eliminated and/ or implemented in any other way. Further, the example display region sampler 134 and/or, more generally, the example display controller 120 of FIG. 1 may be implemented by hardware, software, firmware and/or any combination of hardware, software and/or firmware. Thus, for example, any of the example display region sampler 134 and/or, more generally, the example display controller 120 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the example display controller 120 is/are hereby expressly defined to include a non-transitory computer readable storage device or storage disk such as a memory, a digital versatile disk (DVD), a compact disk (CD), a Blu-ray disk, etc. including the software and/or firmware. Further still, the example display controller 120 may include one or more elements, processes and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
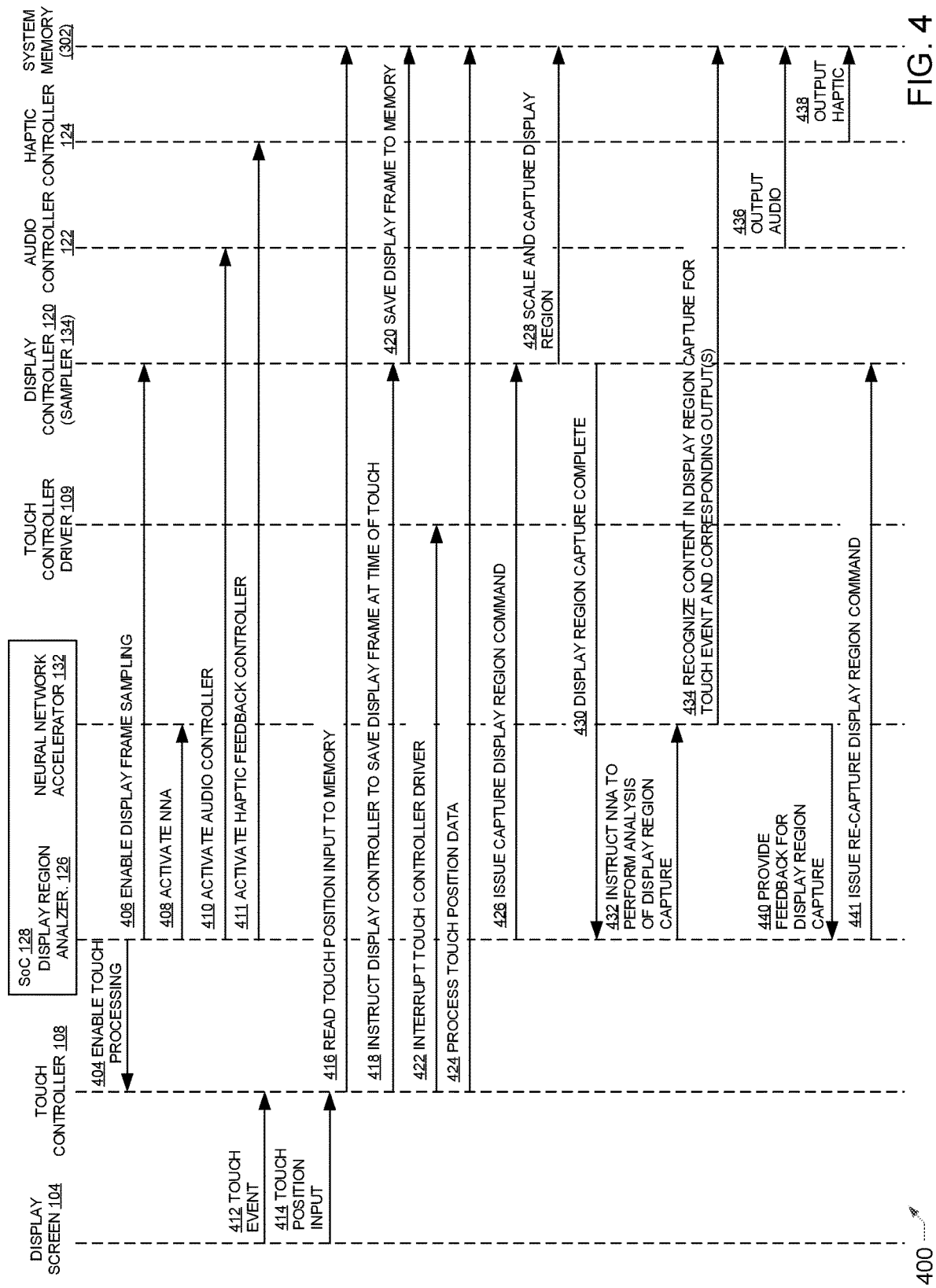
FIG. 4 is communication flow diagram for the example system 100 of FIG. 1.
Figure 5:
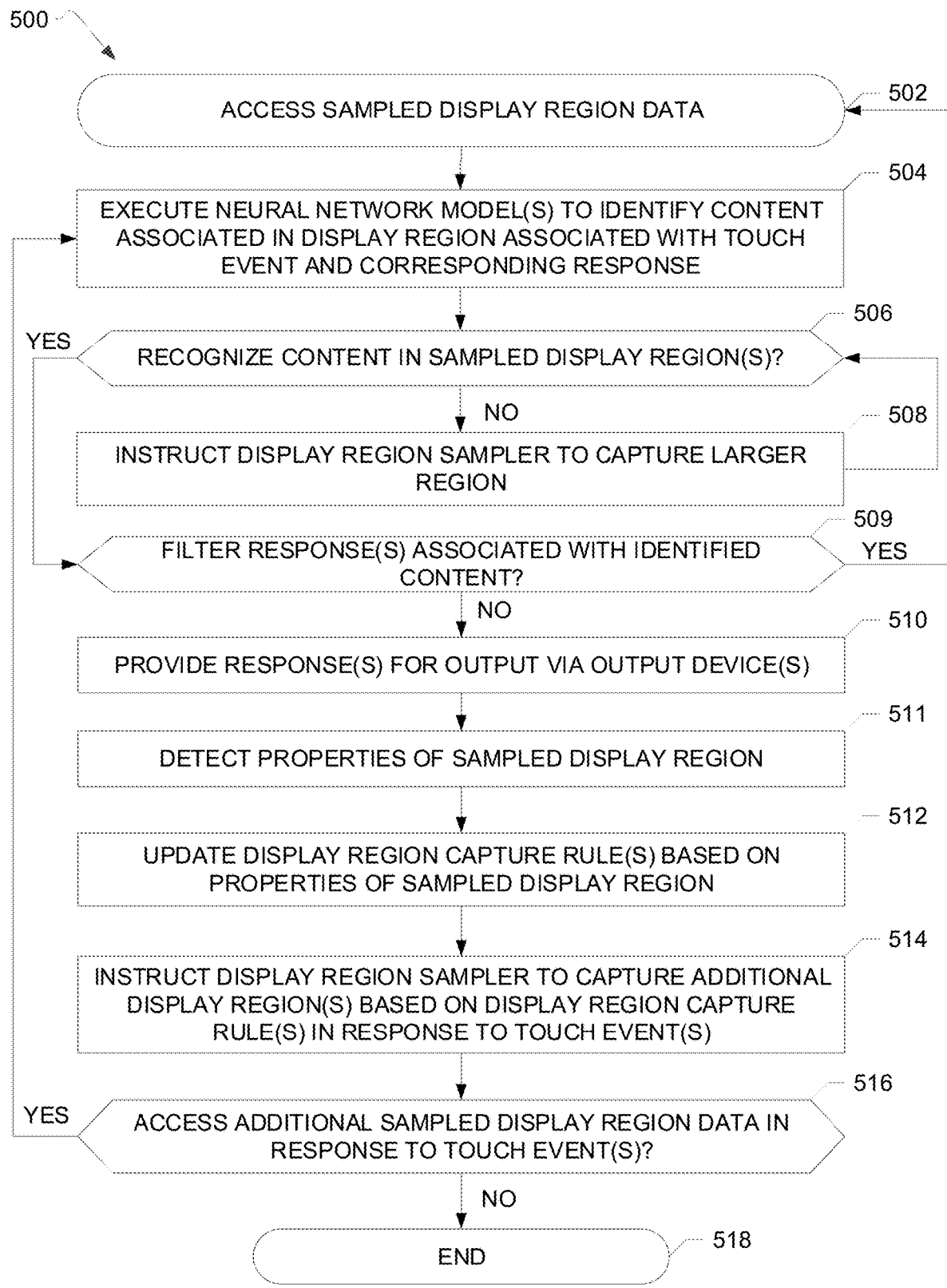
FIG. 5 is a flowchart representative of example machine readable instructions that, when executed, by the display region analyzer of FIGS. 1 and/or 3, cause the example display region analyzer to analyze display frame content and to adjust instructions for a display controller in response to the analysis.

A communication flow diagram including example signals associated with providing an impaired user with outputs indicative of text and/or graphics at position(s) touched on a touch screen is shown in FIG. 4. A flowchart representative of example hardware logic, machine readable instructions, hardware implemented state machines, and/or any combination thereof that may be executed to implement the example display region analyzer 126 is shown in FIG. 5. The machine readable instructions of FIG. 5 may be one or more executable programs or portion(s) of an executable program for execution by a computer processor and/or processor circuitry, such as a processor 712 (e.g., a microcontroller) of the SoC 128 shown in the example processor platform discussed below in connection with FIG. 7. The program may be embodied in software stored on a non-transitory computer readable storage medium such as a CD-ROM, a floppy disk, a hard drive, a DVD, a Blu-ray disk, or a memory associated with the processor(s) 712, but the entire program and/or parts thereof could alternatively be executed by a device other than the processor(s) 712 and/or embodied in firmware or dedicated hardware. Further, although the example program is described with reference to the communication flow diagram illustrated in FIG. 4 and/or the flowchart illustrated in FIG. 5, many other methods of implementing the example the example display region analyzer 126 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 5 for the display region analyzer 126 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a communication flow diagram 400 for the example system 100 of FIG. 1. The example diagram 400 of FIG. 4 represents signaling which occurs to identify content in a region of a display frame that is associated with a touch event on the display screen 104 of the user device 102 and to cause output(s) representative of the content.

In the example of FIG. 4, the display region analyzer 126 performs one or more initialization processes prior to detection of a touch event. For example, the touch controller interface 301 of FIG. 3 transmits instructions to the touch controller 108 to enable touch detection and processing by the touch controller 108 (signal 404). The display controller interface 305 transmits instructions to the display controller 120 to enable the display region sampler 134 of the display controller 120 to sample regions(s) of display frame(s) in response to touch event(s) on the display screen 104 (signal 406). The neural network accelerator interface 310 transmits instructions to the neural network accelerator 132 to prepare the neural network accelerator 132 to perform neural networking analysis of the sampled display region(s) (e.g., by retrieving and/or loading the neural network model(s) 312 at the neural network accelerator 132 for execution by the display region content recognizer 315) (signal 408). The audio controller interface 316 transmits instructions to activate the audio controller 122 to prepare the audio controller 122 to output audio stream(s) generated as a result of the neural network analysis of the display region data (signal 410). The haptic feedback controller interface 318 transmits instructions to activate the haptic feedback controller 124 (signal 411).

A touch event (e.g., by a user's finger(s) and/or an input device such as a stylus) is detected by the display screen touch sensor(s) 106 of the display screen 104 and transmitted as signal data to the touch controller 108 (signal 412). The touch event is represented by touch position data 300, or data representing coordinates of the touch event relative to the display screen 104, and touch event timing, or a time at which the touch event occurred (signal 414). The touch controller 108 reads the touch position data 300 to memory associated with the system 100 (signal 416). In some examples, the memory implements the database 302 of FIG. 3.

In the example diagram of FIG. 4, the touch controller 108 communicates with the display controller 120 to cause the display controller 120 to process the touch event (signals 418, 420, 422, 424). In particular, the touch controller 108 communicates with the display controller 120 to cause the display controller 120 to save the display frame that was rendered at the time of the touch event and, thus, capture the context of the touch event relative to content displayed via the display screen 104 (signals 418, 420).

In response to the touch event, the display controller manager 304 instructs the display region sampler 134 of the display controller 120 to sample or capture a region of the display frame associated with the touch event (signal 426). The display controller manager 304 instructs the display region sampler 134 to capture the display region based on the display capture rule(s) 306 and the touch position data 300. In some examples, the display capture rule(s) 306 define a size or area of the display region to be sampled based on font size of text detected as a result of neural network processing of previously sampled display region(s). In some examples, the display capture rule(s) 306 define a size of the display region sampled based on an amount of pressure associated with the touch event and/or duration of the touch event.

The display region sampler 134 of the display controller 120 samples a region of the display frame based on the touch position data 300 and the size of the region to be captured as instructed by the display controller manager 304 (signal 428). The display controller 120 transmits the sampled display region to the display region analyzer 126 (signal 430). In some examples, the display region data is transmitted via a dedicated display pipe of the display controller 120.

In response to receipt of the sampled display region data 308, the neural network accelerator interface 310 instructs the display region content recognizer 315 to perform neural network processing (e.g., image recognition) of the sampled display region (signal 432). As disclosed herein, the neural network analysis can be performed at the neural network accelerator 132. The display region content recognizer 315 executes the neural network model(s) 312 to identify content in the sampled display region (e.g., text, non-text character(s) or graphical element(s) (e.g., icon(s)), or portion(s) without text or graphical element(s)) (signal 434). As a result of the execution of the neural network model(s), the display region content recognizer 315 determines and generates the data output(s) to be sent to the audio controller 122 and/or the haptic feedback controller 124. For example, in response to the identification of text in the sampled display region, the display region content recognizer 315 generates an audio output including speech sample(s) corresponding to word(s) and/or phrase(s) identified in the text. The audio controller 122 outputs the audio (signal 436). As another example, in response to the identification of non-text characters in the sampled display region, the display region content recognizer 315 generates haptic feedback event(s) to be sent to the haptic feedback controller 124 for output via the haptic feedback actuator(s) 123 of the device 102 (signal 438). In some examples, the display region content recognizer 315 determines that audio output(s) (e.g., sound effects) should be output in response to the detection of non-text characters (e.g., in examples in which haptic feedback is not available).

In some examples, the display controller manager 304 uses results of the neural network processing to update the display capture rule(s) 306 that define the size of the display region to be captured (signal 440). For example, if the display region content recognizer 315 is unable to identify a word in a display region that includes a fragment of the word, the display controller manager 304 instructs the display region sampler 134 to capture a larger region of the display frame associated with the touch event in an effort to provide the full word for analysis by the display region content recognizer 315 (signal 441). Additionally or alternatively, the display controller manager 304 updates the display capture rule(s) 306 to define a size of future display region(s) to be captured from the display frame that includes the previously analyzed display region or from other display frame(s) based on the results of the neural network processing and/or properties of the content identified in previously analyzed display region(s) (e.g., the content recognition data 320). The properties can include, for instance, font size or icon size.

The example diagram 400 of FIG. 4 provides power savings for the user device 102. In particular, the central processing unit of the user device 102 can remain a low power state during one more of processing of the touch event by the touch controller 108 and/or the display region analyzer 126, the sampling of the display region by the display region sampler 134, or the image recognition performed by the display region content recognizer 315. Thus, the example system 100 provides for power savings at the device while providing for text-to-speech and/or haptic feedback output(s) in response to touch event(s).

FIG. 5 is a flowchart representative of example machine readable instructions 500 that, when executed by the display region analyzer 126 of FIGS. 1 and/or 3 cause the display region analyzer 126 to determine whether the display region sampler 134 of the display controller 120 should re-sample or adjust the sampling of display region(s) of display frame(s) rendered via the display screen 104 of the user device 102 of FIG. 1. The example instructions 500 of FIG. 5 can be executed by the SoC 128 of FIG. 1 (e.g., a microcontroller of the SoC 128).

The example instructions 500 of FIG. 5 being with the display region analyzer 126 accessing display region image data 308 from the display controller 120 of the user device 102 (block 502). The display region content recognizer 315 of the display region analyzer 126 executes the neural network model(s) 312 to identify (e.g., predict) content in a sampled display region associated with a touch event and to determine corresponding audio output(s) and/or haptic feedback output(s) based on the identified content (block 504). As disclosed herein, in some examples, the display region content recognizer 315 is implemented by the neural network accelerator 132.

In some examples, the display region content recognizer 315 is unable to recognize content (e.g., text and/or an image such as an icon) in the sampled display region (block 506). For example, the content in the sampled display region may include a fragment of a word and the display region content recognizer 315 is unable to classify the word based on execution of the neural network model(s) 312. In such examples, the display region content recognizer 315 can instruct the display region sampler 134 of the display controller 120 to sample a larger portion or area of the display frame associated with the touch event (block 508). The display controller manager 304 can transmit the instructions from the display region content recognizer 315 to the display region sampler 134 of the display controller 120. The example instructions 500 of FIG. 5 continue to resample the display frame associated with the touch event until the display region content recognizer 315 is able to recognize (e.g., classify, predict) the content (blocks 506, 508).

In the example of FIG. 5, the output filter 322 determines if the responses (e.g., the audio output(s) and/or haptic feedback output(s) associated with the identified content should be filtered (block 509). For example, if, based on the touch position data 300, the output filter 322 determines that a touch event at a particular location or coordinates on the display screen 104 has exceeded a threshold duration (e.g., 5 seconds), the output filter 322 determines that the user has not moved his or her finger on the display screen and/or the input device (e.g., stylus) has not moved on the display screen. In such examples, the output filter 322 prevents or interrupts the audio and/or haptic output(s) from being output after the initial audio and/or haptic feedback output(s) associated with the identified content have been provided via the audio controller 122 or the haptic feedback controller 124, respectively, to prevent repeated output(s) for the same content. If the response(s) are filtered by the output filter 322, the instructions of FIG. 5 return to analyzing (e.g., new) sampled display region(s) data (block 502). If the response(s) are not filtered by the output filter 322, the display region content recognizer 315 provides the output(s) for transmission to the audio controller 122 and/or the haptic feedback controller 124 (e.g., via the audio controller interface 316 and/or the haptic feedback controller interface 318, respectively) (block 510).

In the example of FIG. 5, the display region content recognizer 315 analyzes the data recognized in the sampled display regions, or the content recognition data 320, to identify properties of the content such as font size, icon size, etc. (block 511). The properties of the content serve as feedback for updating or modifying the display capture rule(s) 306. The display controller manager 304 updates the display region capture rule(s) 306 based on the properties of the detected data (block 512). For instance, the display controller manager 304 can update the display region capture rule(s) 306 to cause the display region sampler 134 to capture larger regions or areas of a display frame in response to a font size of text detected in the sampled display region of the display frame. In the example of FIG. 5, the display controller manager 304 instructs the display region sampler 134 of the display controller 120 to sample display region(s) in display frame(s) associated with touch event(s) based on the (e.g., updated) display capture rule(s) 306 (block 514).

The example instructions 500 of FIG. 5 continues analyzing sampled display regions and updating the display capture rule(s) 306 to improve an efficiency with which the display region content recognizer 315 identifies content in the sampled display regions (block 516). The example instructions 500 of FIG. 5 when there are no further sampled display regions to analyze (block 518).

Figure 6:
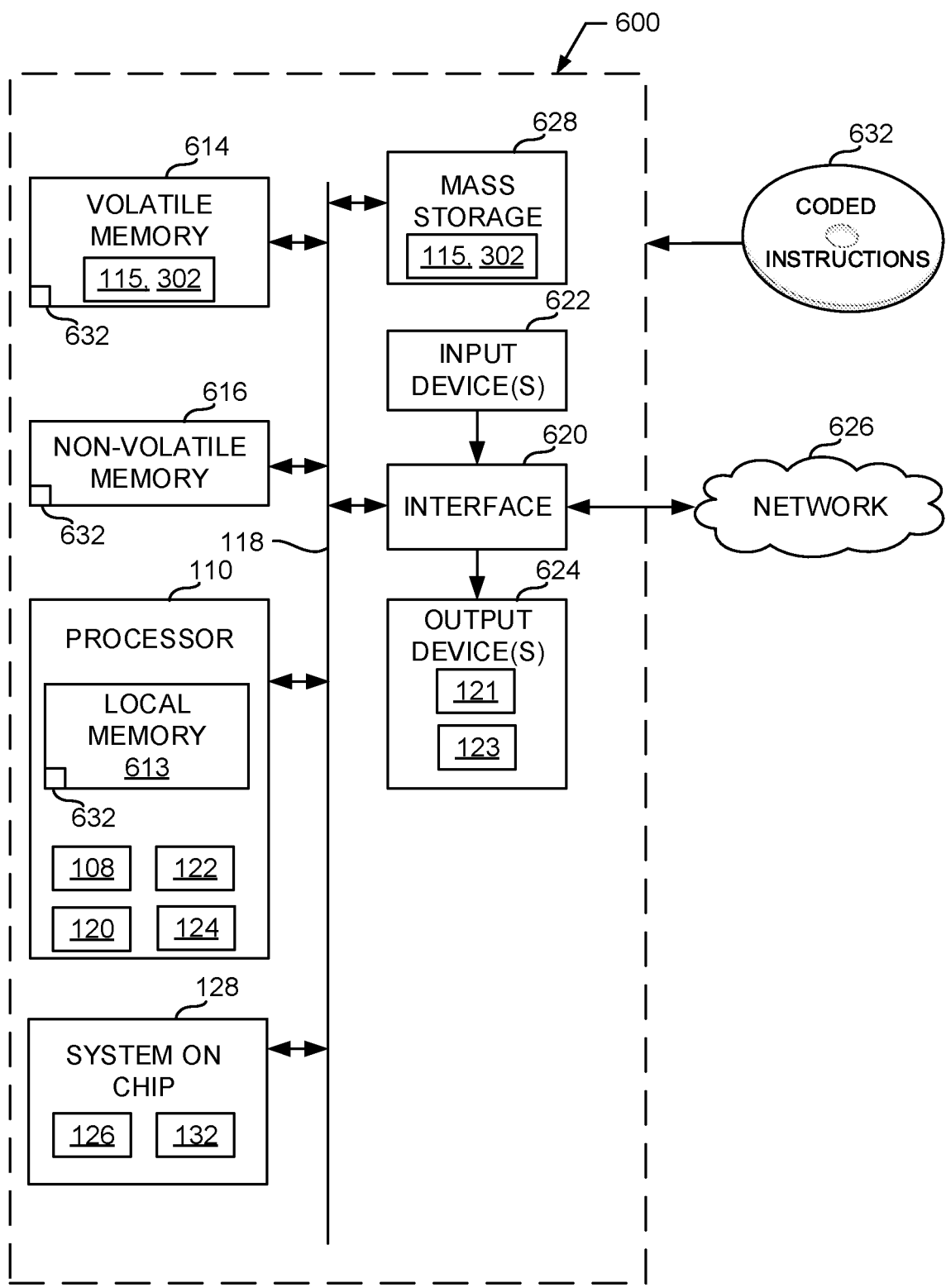
FIG. 6 is a block diagram of an example processing platform structured to implement the example user device of FIG. 1.

FIG. 6 is a block diagram of an example processor platform 600 structured to implement the user device 102 of FIG. 1. The processor platform 600 can be, for example, a personal computer, a workstation, a mobile device (e.g., a cell phone, a smart phone, a tablet such as an iPad), a personal digital assistant (PDA), an Internet appliance, or any other type of computing device.

Figure 7:
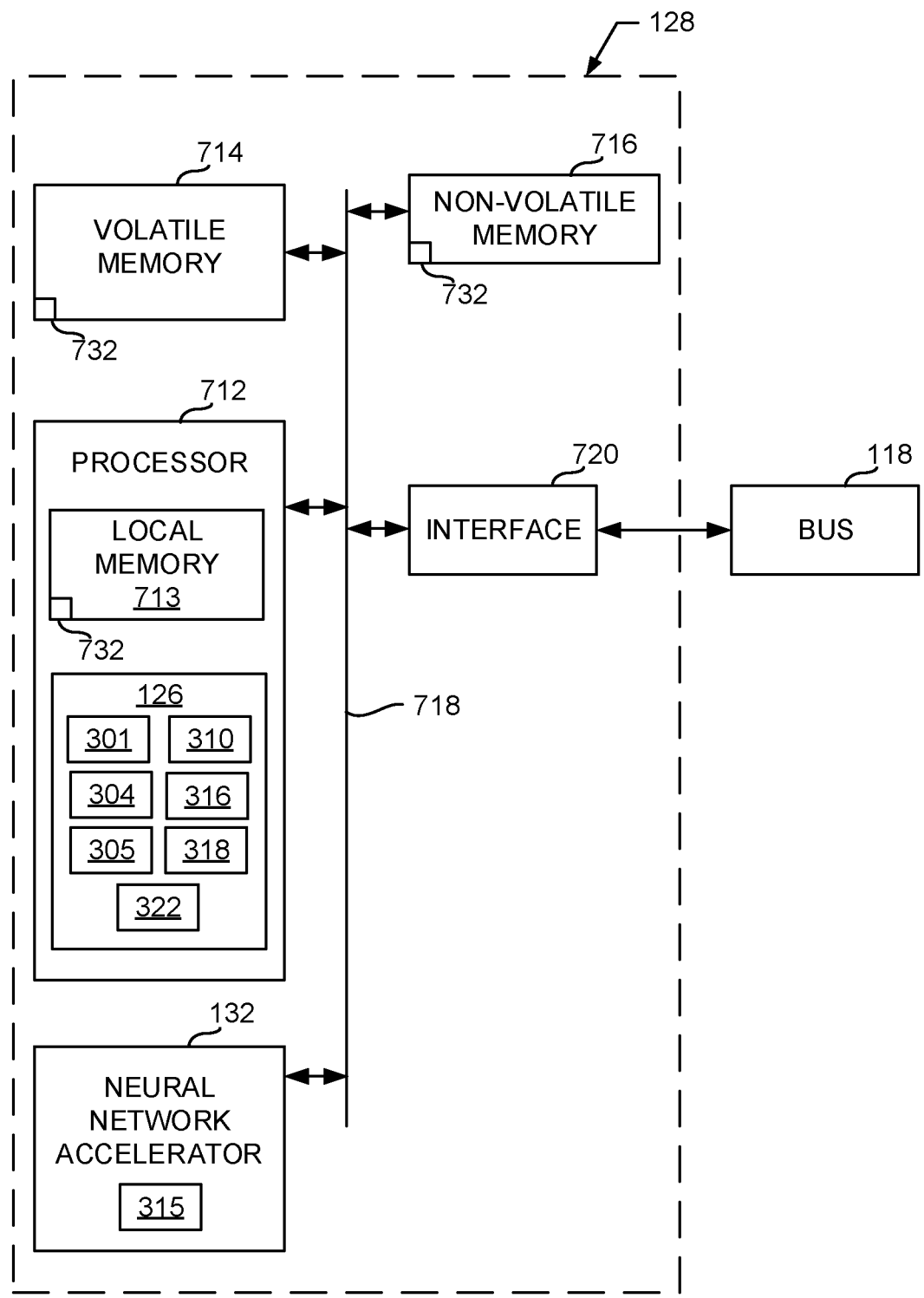
FIG. 7 is a block diagram of an example implementation of the system-on-chip of FIGS. 1 and/or 6.

The processor platform 600 of the illustrated example includes the system-on-chip (SoC) 128. In this example, the SoC 128 includes logic circuitry (e.g., an integrated circuit) encapsulated in a package such as a plastic housing. As disclosed herein, the SoC 128 implements the example display region analyzer 126 and the neural network accelerator 132. An example implementation of the SoC 128 is shown in FIG. 7.

The processor platform 600 of the illustrated example includes the processor 110. The processor 110 of the illustrated example is hardware (e.g., an integrated circuit). For example, the processor 110 can be implemented by one or more integrated circuits, logic circuits, central processing units, microprocessors, GPUs, DSPs, or controllers from any desired family or manufacturer. The hardware processor may be a semiconductor based (e.g., silicon based) device. The processor may include one or more logic cores. In the example of FIG. 6, the processor implements the example touch controller 108, the example display controller 120, the example audio controller 122, and the example haptic feedback controller 124. However, one or more of the touch controller 108, the display controller 120, the audio controller 122, and/or the haptic feedback controller 124 may be implemented by other circuitry.

The processor 110 of the illustrated example includes a local memory 613 (e.g., a cache). The processor 110 of the illustrated example is in communication with a main memory including a volatile memory 614 and a non-volatile memory 616 via the bus 118. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 may be controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 110. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

Machine executable instructions 632 corresponding to the BIOS 114, the operating system 112, the user application(s) 113, and/or some or all of the instructions of FIG. 6 may be stored in the mass storage device 628, in the volatile memory 614, in the non-volatile memory 616, and/or on a removable non-transitory computer readable storage medium such as a CD or DVD.

FIG. 7 is a block diagram of an example implementation of the system-on-chip 128 of FIGS. 1 and/or 7.

The SoC 128 includes the neural network accelerator 132. The neural network accelerator 132 is implemented by one or more integrated circuits, logic circuits, microprocessors, or controllers from any desired family or manufacturer. In this example, the neural network accelerator 132 executes the example display region content recognizer 315.

The SoC 128 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 is implemented by a microcontroller. In this example, the microcontroller 712 implements the example touch controller interface 301, the example display controller interface 305, the example display controller manager 304, the example neural network accelerator interface 310, the example audio controller interface 316, the example haptic feedback controller interface 318, and the example output filter 322. In this example, the microcontroller 712 executes the instructions of FIG. 6 to implement the display region analyzer 126.

The processor 712 of the illustrated example includes a local memory 713 (e.g., a cache). The processor 712 of the illustrated example is in communication with a main memory including a volatile memory 714 and a non-volatile memory 716 via a local bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 may be controlled by a memory controller.

The example processor platform of FIG. 7 also includes an interface circuit 720. The interface circuit 720 of the illustrated example includes a communication device such as a transmitter, a receiver, a transceiver, a modem, and/or a network interface to facilitate exchange of data with external machines (e.g., with the processor 110 and/or any other circuitry and/or computing devices of any kind). The communication can be via, for example, the bus 118 of the processor platform of FIGS. 1 and 6.

The machine executable instructions 732 of FIG. 6 may be stored in the in the volatile memory 714 and/or in the non-volatile memory 716.

The SoC 128 of FIG. 7 is circuitry encapsulated in a housing or package. The SoC 128 may include connectors to couple the SoC 128 to a printed circuit board. These connectors may be part of the interface 720 and serve to carry signals to/from the SoC 128.

Figure 8:
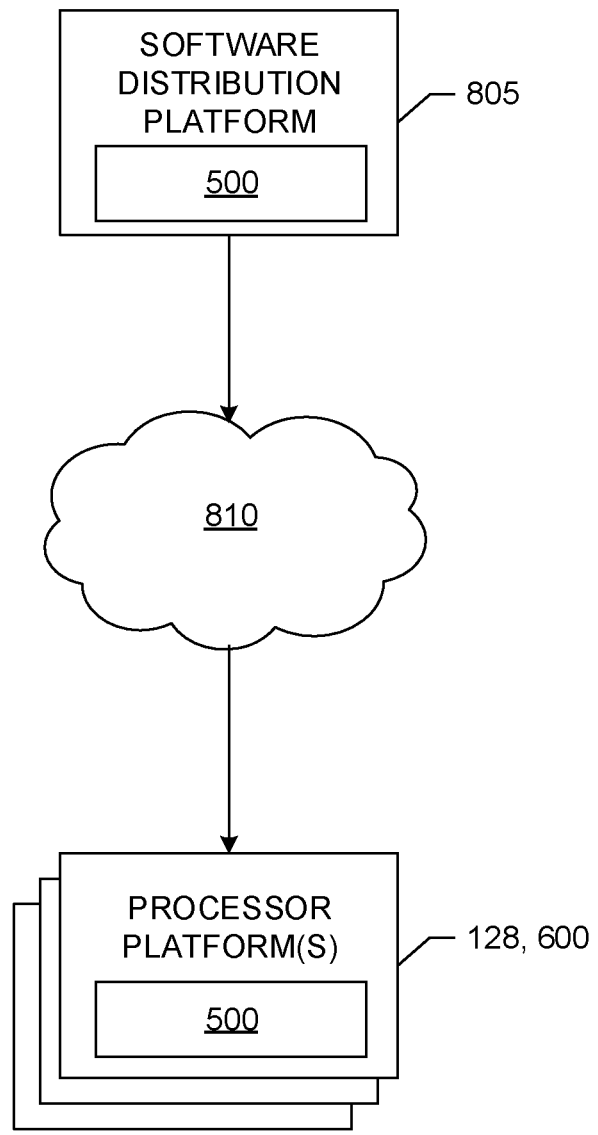
FIG. 8 is a block diagram of an example software distribution platform to distribute software (e.g., software corresponding to the example computer readable instructions of FIG. 5) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 805 to distribute software such as the example computer readable instructions 500 of FIG. 5 to third parties is illustrated in FIG. 8. The example software distribution platform 805 may be used to update the instruction(s) 500 of FIG. 5 on the SoC 128 and/or for the system 100 when the SoC 128 is not present and the instructions 500 of FIG. 5 are executed by the CPU 110.

The example software distribution platform 805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 500 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store respective computer readable instructions 500 of FIG. 5 as described above. The one or more servers of the example software distribution platform 805 are in communication with a network 810, which may correspond to any one or more of the Internet and/or any of the example networks 626 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 500 from the software distribution platform 805. For example, the software, which may correspond to the example computer readable instructions 500 of FIG. 5 may be downloaded to the example processor platform(s) 128, 600, which are to execute the computer readable instructions 500 to implement the display region analyzer 126. In some example, one or more servers of the software distribution platform 805 periodically offer, transmit, and/or force updates to the software (e.g., the example computer readable instructions 500 of FIG. 5) to ensure improvements, patches, updates, etc. are distributed and applied to the software at the end user devices.

From the foregoing, it will be appreciated that example methods, systems, apparatus, and articles of manufacture have been disclosed that provide for low power, low latency, enhanced user accessibility of an electronic user device for a visually, neuralgically, and/or motor impaired user interacting with the device in a low power manner. Examples disclosed herein include a system-on-chip platform for implementing a touch controller, a display controller that captures portion(s) of display frame(s) associated with touch event(s) on a display screen, and a neural network accelerator to identify content in the display frame(s) and output audio and/or haptic feedback representative of the content. Some examples disclosed herein generate audio outputs in response to recognition of text in the user interface to provide the user with an audio stream of words and/or phrases displayed on the screen as the user moves his or her finger relative to the screen. Additionally or alternatively, examples disclosed herein can provide haptic outputs that provide the user with feedback when, for instance, the user touch event is proximate to a graphical element such as an icon or line of a menu box. Thus, examples disclosed herein provide a visually impaired user with increased awareness of the content displayed on the screen in response to touches on the display screen. Some examples disclosed herein adaptively respond to the results of the neural network analysis to, for example, adjust a size of the display region captured by the display controller to improve an accuracy with which the neural network accelerator identifies content. Further, examples disclosed herein can provide user accessibility features in connection with different user applications and/or operating systems and/or computing environments such as BIOS mode as a result of the system-on-chip architecture.

Example computing platforms and related methods for providing accessible user interfaces are disclosed herein. Further examples and combinations thereof include the following:

Example 1 includes an apparatus including a display controller to sample a region of a display frame associated with a location of a touch on a display screen of a user device and logic circuitry to, after a Basic Input Output System (BIOS) is operational in the user device and prior to loading of an operating system of the user device identify content in the display region and cause at least one output device to generate an output representative of the content, the output including at least one of an audible output or a haptic output.

Example 2 includes the apparatus of example 1, wherein the logic circuitry includes a neural network accelerator, the neural network accelerator to execute a neural network model to identify the content in the display region.

Example 3 includes the apparatus of examples 1 or 2, wherein the content includes text and the audible output corresponds to the text.

Example 4 includes the apparatus of examples 1 or 2, wherein the content includes a non-textual graphic and the haptic output is to indicate presence of the non-textual graphic at the location of the touch.

Example 5 includes the apparatus of examples 1 or 2, wherein the display region is a first display region and the logic circuitry is to instruct the display controller to sample a second region of the display frame based on the content, the second display region including the first display region.

Example 6 includes the apparatus of examples 1 or 2, wherein the display region is a first display region, the content includes text, and the logic circuitry is to detect a size of the text and instruct the display controller to sample a second region of the display frame, a size of the second region to be based on the size of the text.

Example 7 includes the apparatus of examples 1 or 2, wherein the display region is a first display region, the content includes text, and the logic circuitry is to identify a portion of a word in the text and instruct the display controller to sample the display frame to generate a second display region, the second display region to include an entirety of the word.

Example 8 includes the apparatus of example 1, wherein the logic circuitry is included in a system-on-chip.

Example 9 includes the apparatus of example 8, further including at least one processor to execute the operating system, the system-on-chip separate from the at least one processor.

Example 10 includes the apparatus of example 9, wherein the system-on-chip is to operate in at least a pre-boot state of the user device.

Example 11 includes a user device including a touch screen, a first processor to execute a Basic Input Output System (BIOS) and an operating system of the user device and a system-on-chip including a second processor. The second processor is to operate at a time when the BIOS is active and the operating system is inactive, the second processor to identify content of an image at a location associated with a touch on the touch screen and instruct one or more output devices to generate at least one or an audio response or a haptic feedback response indicative of the content.

Example 12 includes the user device of example 11, wherein the system-on-chip includes a neural network accelerator.

Example 13 includes the user device of examples 11 or 12, further including a display controller to sample a region of the image, the second processor to identify the content by processing data associated with the sampled region.

Example 14 includes the user device of example 13, wherein the region is a first display region, the location is a first location, the display controller is to sample a second display region of the image, and the second processor is to identify content in the second display region; compare the first location of the first touch and the second location of the second touch; and if the second location is different from the first location, instruct one or more output devices to generate at least one of an audio response or a haptic feedback response indicative of the content in the second display region, and if second location is a same as the first location, prevent the second audio response indicative of the content in the second display region from being output.

Example 15 includes the user device of example 13, wherein the region is a first display region the second processor is to determine a size of a second display region of the image to be sampled by the display controller based on the content identified in the first display region.

Example 16 includes the user device of example 13, wherein the region is a first display region, the content includes text, and the second processor is to identify a portion of a word in the text and instruct the display controller to sample the image to generate a second display region, the second display region to include an entirety of the word.

Example 17 includes the user device of example 11, wherein the second processor implements a neural network accelerator.

Example 18 includes an apparatus including means for detecting a touch event on a display screen of a user device; means for sampling a region of a display frame rendered via the display screen of the user device in response to the touch event; means for storing; and means for processing to: identify content in the display region; generate an output representative of the content; and cause the output to be presented via one or more output devices.

Example 19 includes the apparatus of example 18, wherein the means for processing includes a neural network accelerator.

Example 20 includes the apparatus of examples 18 or 19, wherein the means for processing is included in a system-on-chip.

Example 21 includes the apparatus of examples 18 or 19, wherein the output includes an audio output.

Example 22 includes the apparatus of example 21, wherein the content includes one or more of text or non-text graphics.

Example 23 includes the apparatus of examples 18 or 19, wherein the output includes a haptic feedback output.

Example 24 includes the apparatus of example 23, wherein the content includes non-text graphics.

Example 25 includes the apparatus of examples 18 or 19, wherein the display region is a first display region and the processing means is to instruct the sampling means to sample the display frame to generate a second display region based on the content, the second display region including the first display region.

Example 26 includes the apparatus of examples 18 or 19, wherein the display region is a first display region, the content includes text, and the processing means is to identify a size of the text and instruct the sampling means to generate the second region having a size based on the size of the text.

Example 27 includes the apparatus of examples 18 or 19, wherein the display region is a first display region, the content includes text, and the second processor is to identify a portion of a word in the text and instruct the sampling means to sample the image to generate a second display region, the second display region to include an entirety of the word.

Example 28 includes at least one storage device comprising instructions that, when executed, cause logic circuitry to at least identify content in a first display region of a first display frame associated with a location of a touch on a display screen cause at least one output device to generate an output representative of the content, and instruct a display controller to generate a second display region of the first display frame or of a second display frame based on the content in the first display region, the first display region having a first area and the second display region having a second area, the first area different than the second area.

Example 29 includes the at least one storage device of example 28, wherein the second display region includes the first display region.

Example 30 includes the at least one storage device of example 28, wherein the content includes text and the instructions, when executed, cause the logic circuitry to identify a font size of the text, the area of the second display region to be based on the font size.

Example 31 includes the at least one storage device of any of examples 28-30, wherein the output includes one or more of an audio output or a haptic feedback output.

Example 32 includes the at least one storage device of examples 28 or 29, wherein the content in the first display region includes a portion of a word and content in the second display region include an entirety of the word.

The following claims are hereby incorporated into this Detailed Description by this reference, with each claim standing on its own as a separate embodiment of the present disclosure.

What is claimed is:

1. An apparatus comprising:
   a display controller to sample a first display region of a display frame associated with a location of a touch on a display screen of a user device, the first display region having a first size; and
   at least one logic circuit to:
     execute a neural network model based on content in the first display region to generate one of a first neural network output or a second neural network output;
     responsive to the first neural network output, cause at least one output device to generate an output representative of the content, the output including at least one of an audible output or a haptic output; and
     responsive to the second neural network output, cause the display controller to sample a second display region of the display frame, the second display region having a second size different than the first size of the first display region.

2. The apparatus of claim 1, wherein one or more of the at least one logic circuit includes a neural network accelerator, the neural network accelerator to execute the neural network model to identify the content in the first display region and generate the first neural network output responsive to the identification.

3. The apparatus of claim 1, wherein the content includes text and the audible output corresponds to the text.

4. The apparatus of claim 1, wherein the content includes a non-textual graphic and the haptic output is to indicate presence of the non-textual graphic at the location of the touch.

5. The apparatus of claim 1, wherein the second display region includes the first display region.

6. The apparatus of claim 1, wherein the content includes text and, responsive to the second neural network output, one or more of the at least one logic circuit is to:
  detect a size of the text; and
  instruct the display controller to sample the second display region of the display frame based on the size of the text.

7. The apparatus of claim 1, wherein the content includes text and, responsive to the second neural network output, one or more of the at least one logic circuit is to:
  identify a portion of a word in the text; and
  instruct the display controller to sample the second display region to include an entirety of the word.

8. The apparatus of claim 1, wherein one or more of the at least one logic circuit is included in a system-on-chip.

9. The apparatus of claim 8, further including at least one processor circuit to execute an operating system of the user device, the system-on-chip separate from the at least one processor circuit.

10. The apparatus of claim 9, wherein the system-on-chip is to operate in at least a pre-boot state of the user device.

11. A user device comprising:
  a touch screen;
  a display controller;
  at least one first processor circuit to execute a Basic Input Output System (BIOS) and an operating system of the user device; and
  a system-on-chip including at least one second processor circuit, the at least one second processor circuit to operate at a time when the BIOS is active and the operating system is inactive, the at least one second processor circuit to:
    classify, based on an output of a neural network model, content of an image at a location associated with a touch on the touch screen as recognized content, the recognized content in a first display region of the image sampled by the display controller; and
    instruct one or more output devices to generate at least one of an audio response or a haptic feedback response indicative of the recognized content; and
    determine a size of a second display region of the image to be sampled by the display controller based on the recognized content.

12. The user device of claim 11, wherein the system-on-chip includes a neural network accelerator.

13. The user device of claim 11, wherein one or more of the at least one second processor circuit is to execute the neural network model to identify the content in the first display region.

14. The user device of claim 13, wherein the location is a first location, the touch is a first touch, the audio response is a first audio response, the display controller is to sample the second display region of the image at a second location associated with a second touch on the touch screen, and one or more of the at least one second processor circuit is to:
  identify content in the second display region;
  compare the first location of the first touch and the second location of the second touch; and
  if the second location is different from the first location, instruct the one or more output devices to generate at least one of a second audio response or a haptic feedback response indicative of the content in the second display region, and
  if the second location is a same as the first location, prevent the second audio response indicative of the content in the second display region from being output.

15. The apparatus of claim 1, wherein one or more of the at least one logic circuit is to execute the neural network model after a Basic Input Output System (BIOS) is operational in the user device and prior to loading of an operating system of the user device.

16. The user device of claim 13, wherein the location is a first location, the touch is a first touch, the display controller is to sample the second display region of the image at a second location associated with a second touch on the touch screen, and one or more of the at least one second processor circuit is to:
  identify a portion of a word in text in the second display region; and
  instruct the display controller to sample the image to generate a third display region, the second display region to include an entirety of the word.

17. An apparatus comprising:
  means for detecting a touch event on a display screen of a user device;
  means for sampling a first display region of a display frame rendered via the display screen of the user device in response to the touch event; and
  means for processing to:
    execute a neural network model to identify content in the first display region;
    generate an output representative of the content;
    cause the output to be presented via one or more output devices; and
    determine a property of the content identified by the neural network model; and
    cause the sampling means to generate a second display region of the display frame based on the property of the content.

18. The apparatus of claim 17, wherein the processing means is included in a system-on-chip.

19. The apparatus of claim 17, wherein the content includes text and the processing means is to:
  identify a size of the text; and
  instruct the sampling means to generate the second display region having a size based on the size of the text.

20. The apparatus of claim 17, wherein the content includes text and the processing means is to:
  identify a portion of a word in the text; and
  instruct the sampling means to generate the second display region to include an entirety of the word in the second display region.

* * * * *